US011814292B2

(12) United States Patent
El-Kady et al.

(10) Patent No.: US 11,814,292 B2
(45) Date of Patent: Nov. 14, 2023

(54) METHODS OF GRAPHENE PRODUCTION AND COMPOSITIONS THEREOF

(71) Applicant: NANOTECH ENERGY, INC., Sunny Isles Beach, FL (US)

(72) Inventors: Maher F. El-Kady, Los Angeles, CA (US); Zhiwei Peng, Chico, CA (US); Reta Betar Farah, Chico, CA (US)

(73) Assignee: NANOTECH ENERGY, INC., Sunny Isles Beach, FL (US)

( * ) Notice: Subject to any disclaimer, the term of this patent is extended or adjusted under 35 U.S.C. 154(b) by 0 days.

(21) Appl. No.: 17/384,545

(22) Filed: Jul. 23, 2021

(65) Prior Publication Data

US 2023/0249975 A1 Aug. 10, 2023

(51) Int. Cl.
*C01B 32/198* (2017.01)

(52) U.S. Cl.
CPC ........ *C01B 32/198* (2017.08); *C01P 2004/17* (2013.01); *C01P 2006/10* (2013.01); *C01P 2006/12* (2013.01); *C01P 2006/16* (2013.01); *C01P 2006/40* (2013.01)

(58) Field of Classification Search
CPC . C01B 32/182; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; C01P 2004/17; C01P 2006/10; C01P 2006/12; C01P 2006/16; C01P 2006/40
See application file for complete search history.

(56) References Cited

U.S. PATENT DOCUMENTS

| | | | |
|---|---|---|---|
| 8,557,916 B1 | 10/2013 | Alsharaeh et al. | |
| 9,399,580 B2 | 7/2016 | Qiu et al. | |
| 10,843,145 B2 | 11/2020 | Marques Abrantes et al. | |
| 2016/0016802 A1 | 1/2016 | Qiu et al. | |
| 2018/0142114 A1* | 5/2018 | Duan ................... | H01M 4/0404 |
| 2018/0319667 A1 | 11/2018 | Kaner et al. | |
| 2018/0327268 A1 | 11/2018 | Lu et al. | |
| 2018/0339906 A1* | 11/2018 | Lu .......................... | C01B 32/192 |
| 2020/0152988 A1 | 5/2020 | Gao et al. | |

FOREIGN PATENT DOCUMENTS

| | | | | |
|---|---|---|---|---|
| CN | 102923698 | * | 2/2013 | ............. C01B 31/04 |
| WO | WO-2018188419 A1 | | 10/2018 | |
| WO | WO-2020049373 A1 | | 3/2020 | |

OTHER PUBLICATIONS

Machine Translation of CN 102923698 (Year: 2013).*

(Continued)

*Primary Examiner* — Daniel C. McCracken
(74) *Attorney, Agent, or Firm* — Dustin M. Luettgen, Esq.; Wilson Sonsini Goodrich & Rosati

(57) ABSTRACT

Provided herein compositions of activated graphene oxide (AGO) and activated reduced graphene oxide (ARGO) and methods of producing thereof. The AGO and ARGO provided herein exhibit high surface areas and conductivities, and the methods herein enable facile production at large scales.

21 Claims, 26 Drawing Sheets

(56) References Cited

OTHER PUBLICATIONS

Dreyer, et al., The chemistry of graphene oxide, Chem. Soc. Rev. 2010; 39: 228-240 (Year: 2010).*

Coleman, et al., Defect formation in graphene nanosheets by acid treatment: an x-ray absorption spectroscopy and density functional theory study, J. Phys. D: Appl. Phys. 2008; 41: 062001: pp. 1-4 (Year: 2008).*

Ye, et al., Optimization of Spray-Drying Process with Response Surface Methodology (RSM) for Preparing High Quality Graphene Oxide Slurry, Processes 2021; 9: 1116, pp. 1-15 (Year: 2021).*

Voiry, et al., High-quality graphene via microwave reduction of solution-exfoliated graphene oxide, Science 2016; 353(6): 1413-1416 with Supplementary Materials (Year: 2016).*

Jakhar, et al., Microwave reduction of graphene oxide, Carbon 2020; 170: 277-293 (Year: 2020).*

Agarwal, et al., Strategies for reduction of graphene oxide—A comprehensive review, Chemical Engineering Journal 2021; 405: 127018, pp. 1-29 (Year: 2021).*

Parviz, et al., Tailored Crumpling and Unfolding of Spray-Dried Pristine Graphene and Graphene Oxide Sheets, Small 2015; 11(22): 2661-2668 (Year: 2015).*

Han et al.: In-plane carbon lattice-defect regulating electrochemical oxygen reduction to hydrogen peroxide production over nitrogen-doped graphene. ACS Catalysis. 9:1283-1288 (2019).

PCT/US2022/038083 International Search Report and Written Opinion dated Nov. 10, 2022.

\* cited by examiner

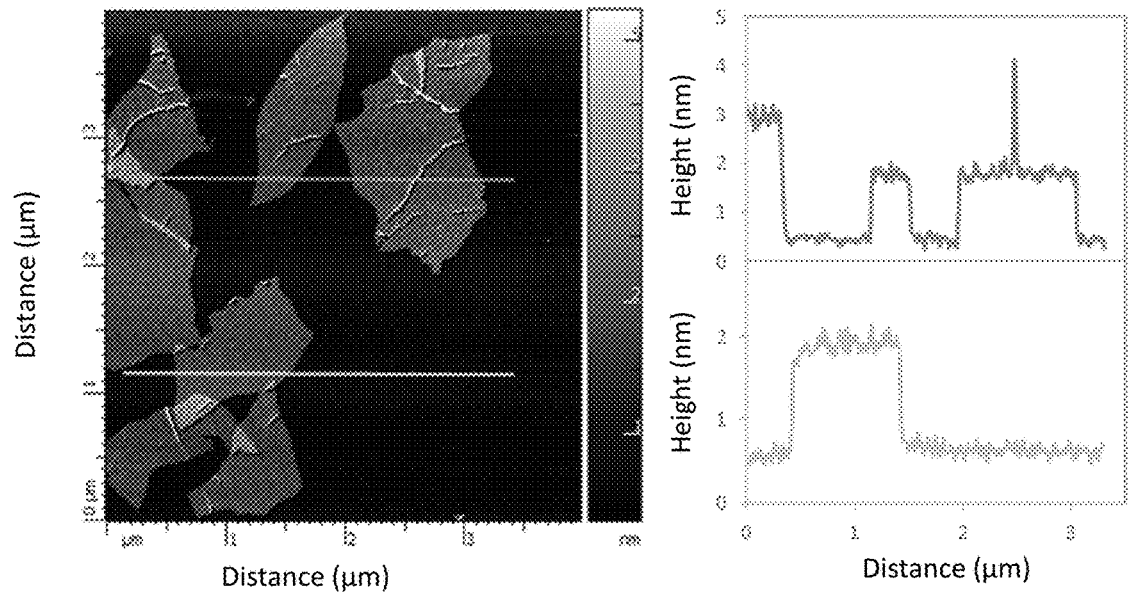
FIG. 2A
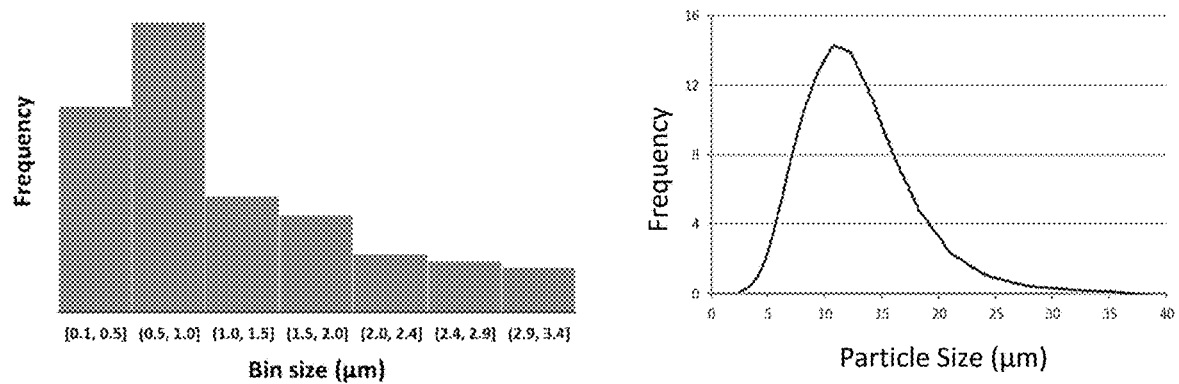
FIG. 2B
FIG. 2C

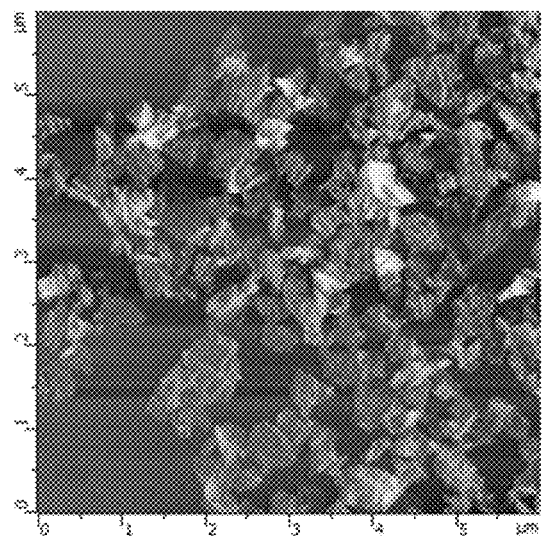
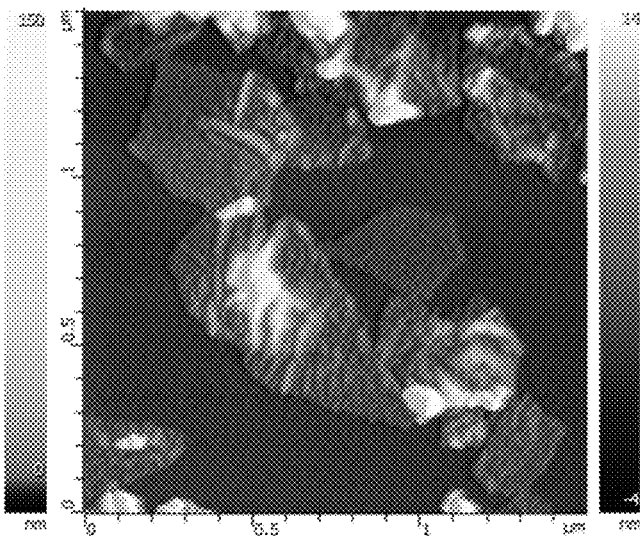
FIG. 12A
FIG. 12B
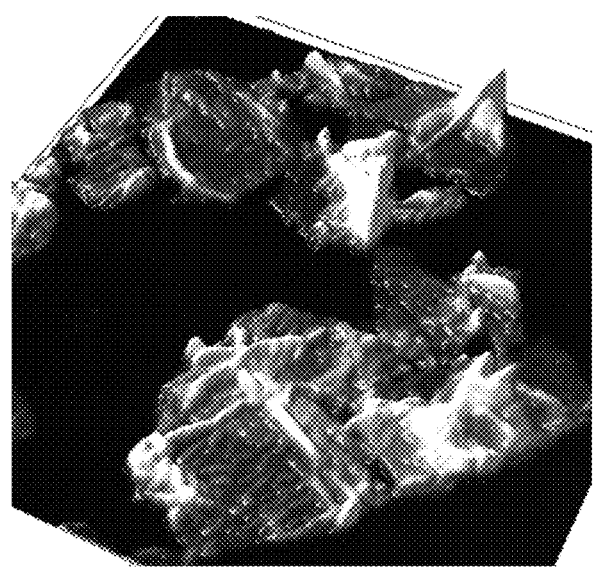
FIG. 12C

METHODS OF GRAPHENE PRODUCTION AND COMPOSITIONS THEREOF

BACKGROUND

Bulk graphite, which is readily available, comprises many graphene layers adjoined via strong van der Waals interactions, but lacks a sufficient accessible surface area needed for several electronic applications. Graphene is a two-dimensional material having a hexagonal honeycomb lattice structure comprising $sp^2$ carbon atoms. Due to its unique structure, graphene exhibits excellent electrical conductivity, thermal conductivity, mechanical strength, and surface area. As a result, graphene has been introduced into various applications such as energy storage devices, flexible conductive films, and electromagnetic shields. Graphene has also been used to improve surfactants, photonics devices, optoelectronic devices, water filtration systems, and protective coatings. Therefore, the production of single-layered and/or few-layered graphene at an industrial scale and throughput is highly desired.

SUMMARY

Aspects disclosed herein provide a method for forming activated graphene oxide sheets, the method comprising: heating a first solution comprising an etchant and graphene oxide to form activated graphene oxide sheets comprising in-plane defects; filtering the first solution to purify the activated graphene oxide sheets; and spray drying the activated graphene oxide sheets. In some embodiments, the first solution has a concentration of graphene oxide of about 1 mg/ml to about 20 mg/ml. In some embodiments, the first solution has a concentration of graphene oxide of about 1 mg/ml to about 20 mg/ml. In some embodiments, the first solution has a concentration by volume of the etchant of about 60% to about 98%. In some embodiments, the etchant comprises hydrogen peroxide, bromine, iodine, potassium permanganate, potassium chlorate, potassium dichromate, manganese oxide, iron(iii) chloride, sodium peroxide, potassium persulfate, hypochlorous acid, or any combination thereof. In some embodiments, the first solution comprising the etchant and the graphene oxide is heated to a temperature of about 60° C. to about 120° C. In some embodiments, the method further comprises annealing the activated graphene oxide sheets. In some embodiments, the annealing is performed in air, nitrogen, argon, or any combination thereof. In some embodiments, the first solution is cooled by adding ice, ice water, or chilled water to the first solution after being heated. In some embodiments, the first solution is cooled to a temperature of about 70° C. to about 90° C. after being heated. In some embodiments, filtering the first solution is performed with a mesh size of about 0.5µm to about 3µm. In some embodiments, the filtered first solution is washed to obtain a pH of about 1 to about 7. In some embodiments, the spray drying is performed at a flow rate of about 1 ml/hr to about 6,000 ml/hr. In some embodiments, the spray drying is performed at a pressure of about 10 psi to about 50 psi. In some embodiments, the spray drying is performed with an inlet temperature of about 120° C. to about 200° C. In some embodiments, an outlet temperature of the spray drying is about 30° C. to about 80° C. In some embodiments, the activated graphene oxide sheets have a defect density of about 0.1 to about 2. In some embodiments, the in-plane defects of the activated graphene oxide sheets comprise pores having a size of about 0.5 nm to about 5 nm. In some embodiments, a percentage of the activated graphene oxide sheets that is monolayered is at least about 85%. In some embodiments, the activated graphene oxide sheets have an average lateral dimension of about 0.2 µm to about 4 µm. In some embodiments, the activated graphene oxide sheets have a surface area of about 450 $m^2/g$ to about 1,500 $m^2/g$. In some embodiments, the activated graphene oxide sheets have a density of about 0.2 $g/cm^3$ to about 1.5 $g/cm^3$. In some embodiments, the activated graphene oxide sheets have an atomic carbon content of about 60% to about 75%. In some embodiments, the activated graphene oxide sheets have an atomic oxygen content of about 20% to about 65%. In some embodiments, the activated graphene oxide sheets have a carbon content by weight of about 35% to about 60%. In some embodiments, the activated graphene oxide have an oxygen content by weight of about 35% to about 55%. In some embodiments, the activated graphene oxide sheets have an ash content by weight of at most about 1.5%. In some embodiments, the activated graphene oxide sheets have an electromobility of at most about 500 $cm^2/V/s$. In some embodiments, the activated graphene oxide sheets have a conductivity of about 1,000 S/m to about 3,000 S/m. In some embodiments, the method further comprises reducing the activated graphene oxide to form activated reduced graphene oxide sheets. In some embodiments, reducing the activated graphene oxide comprises drying the activated graphene oxide sheets. In some embodiments, the drying occurs for a period of time of about 1 minute to about 180 minutes. In some embodiments, reducing the activated graphene oxide sheets comprises microwaving the activated graphene oxide after thermal reduction to form an activated reduced graphene oxide. In some embodiments, the microwaving occurs over a period of time of about 5 seconds to about 300 seconds. In some embodiments, the microwaving occurs at a power of about 500 W to about 2,000 W. In some embodiments, reducing the activated graphene oxide comprises: a) heating a second solution comprising: i) the activated graphene oxide; and ii) a strong base; and b) adding a reducing agent to the second solution; c) filtering and washing the reducing agent and the second solution. In some embodiments, the second solution is heated to a temperature of about 60° C. to about 120° C. In some embodiments, the strong base comprises sodium hydroxide, ammonium hydroxide, potassium hydroxide, urea, melamine, sodium carbonate, or any combination thereof. In some embodiments, the reducing agent comprises ascorbic acid, hydrazine, sodium borohydride, pyrogallol, lithium aluminum hydride, ammonia borane, thiourea dioxide, hydroiodic acid, hydrogen bromide, ethanethiol-aluminum chloride, Lawesson's reagent, sodium bisulfite, sodium dithionite, aluminum, iron, zinc, magnesium, or any combination thereof. In some embodiments, the second solution is filtered and washed within about 0.5 hours to about 10 hours after the addition of the reducing agent to the second solution. In some embodiments, filtering and washing the second solution occurs when the second solution has a pH of about 8 to about 11. In some embodiments, reducing the activated graphene oxide sheets comprises annealing the spray dried graphene oxide sheets. In some embodiments, reducing the activated graphene oxide does not comprise annealing the spray dried first solution. In some embodiments, the purified graphene oxide sheets form a paste having water content that is removed during spray drying. In some embodiments, the activated graphene oxide sheets are annealed within a heating chamber. In some embodiments, the annealing is performed at a temperature of about 150° C. to about 1,500° C. In some embodiments, the annealing is performed by a flame torch, a heating strip, a heating coil, or any combination thereof. In some embodiments, the annealing is performed in air, nitrogen, argon, or any combination thereof. In some embodiments, annealing occurs for a period of time of about 1 minute to about 1,500 minutes. In some embodiments, the activated reduced graphene oxide sheets have an average lateral dimension of about 0.2 µm to about 0.9 µm. In some embodiments, the activated reduced graphene oxide sheets have a surface area of about 650 m$^2$/g to about 1,500 m$^2$/g. In some embodiments, the activated reduced graphene oxide sheets have a density of about 0.0001 g/cm$^3$ to about 0.05 g/cm$^3$. In some embodiments, the activated reduced graphene oxide sheets have an ash content by weight of at most about 1%. In some embodiments, the activated reduced graphene oxide sheets have an electromobility of at most about 500 cm$^2$/V/s. In some embodiments, the activated reduced graphene oxide sheets have a conductivity of about 1,000 S/m to about 3,000 S/m. In some embodiments, the graphene oxide is substantially free from any OH functional groups.

Aspects disclosed herein provide an activated graphene oxide having a defect density of about 0.1 to about 2 and an oxygen content by weight of at least about 30%. In some embodiments, the activated graphene oxide has in-plane pores having a size of about 0.5 nm to about 5 nm. In some embodiments, the activated graphene oxide has a percentage of the activated graphene oxide that is monolayered is at least about 85%. In some embodiments, the activated graphene oxide has an average lateral dimension of about 0.2 µm to about 4 µm. In some embodiments, the activated graphene oxide has a surface area of about 450 m$^2$/g to about 1,500 m$^2$/g. In some embodiments, the activated graphene oxide has a density of about 0.2 g/cm$^3$ to about 1.5 g/cm$^3$. In some embodiments, the activated graphene oxide has a carbon content by weight of about 65% to about 75%. In some embodiments, the activated graphene oxide has an oxygen content by weight of about 25% to about 30%. In some embodiments, the activated graphene oxide has an ash content by weight of at most about 1.5%. In some embodiments, the activated graphene oxide has a conductivity of about 1,000 S/m to about 3,000 S/m. In some embodiments, the activated graphene oxide has an electromobility of at most about 500 cm$^2$/V/s. In some embodiments, the graphene oxide is arranged in a plurality of layers defining a plurality of voids between each layer when viewed under a scanning electron microscope at 50,000× magnification. In some embodiments, the graphene oxide comprises a plurality of surface defects having a depth between 1-15 nm. In some embodiments, the graphene oxide is substantially free from any OH functional groups.

Aspects disclosed herein provide an activated graphene oxide with a defect density of about 0.1 to about 2 and an oxygen content by weight of no more than about 20%. In some embodiments, the activated graphene oxide has an average lateral dimension of about 0.2 µm to about 0.9 µm. In some embodiments, the activated graphene oxide has a surface area of about 650 m$^2$/g to about 1,500 m$^2$/g. In some embodiments, the activated graphene oxide has a density of about 0.002 g/cm$^3$ to about 0.005 g/cm$^3$. In some embodiments, the activated graphene oxide has a carbon content by weight of about 85% to about 98%. In some embodiments, the activated graphene oxide has an oxygen content by weight of about 2% to about 15%. In some embodiments, the activated graphene oxide has an ash content by weight of at most about 1%. In some embodiments, the activated graphene oxide has an electromobility of at most about 500 cm$^2$/V/s. In some embodiments, the activated graphene oxide has a conductivity of about 1,000 S/m to about 3,000 S/m. In some embodiments, the activated graphene oxide has a defect density of about 0.5 to about 1.3. In some embodiments, the activated graphene oxide is arranged in a plurality of bent, lateral sheets which define a plurality of pores between the plurality of lateral sheets, when viewed under a scanning electron microscope at 50,000× magnification. In some embodiments, any one of the plurality of pores are interconnected with at least one other pore. In some embodiments, the graphene oxide is substantially free from any OH functional groups.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 2A shows a first atomic force microscopy (AFM) image an exemplary AGO, per one or more embodiments herein;

FIG. 2B shows a particle size distribution chart of the exemplary AGO of FIG. 3A, per one or more embodiments herein;

FIG. 2C shows a particle size distribution graph of the exemplary AGO of FIG. 3A, per one or more embodiments herein;

FIG. 12A shows a first AFM image an exemplary second ARGO, per one or more embodiments herein;

FIG. 12B shows a second AFM image an exemplary second ARGO, per one or more embodiments herein;

FIG. 12C shows a third AFM image an exemplary second ARGO, per one or more embodiments herein;

DETAILED DESCRIPTION

Figure 1:
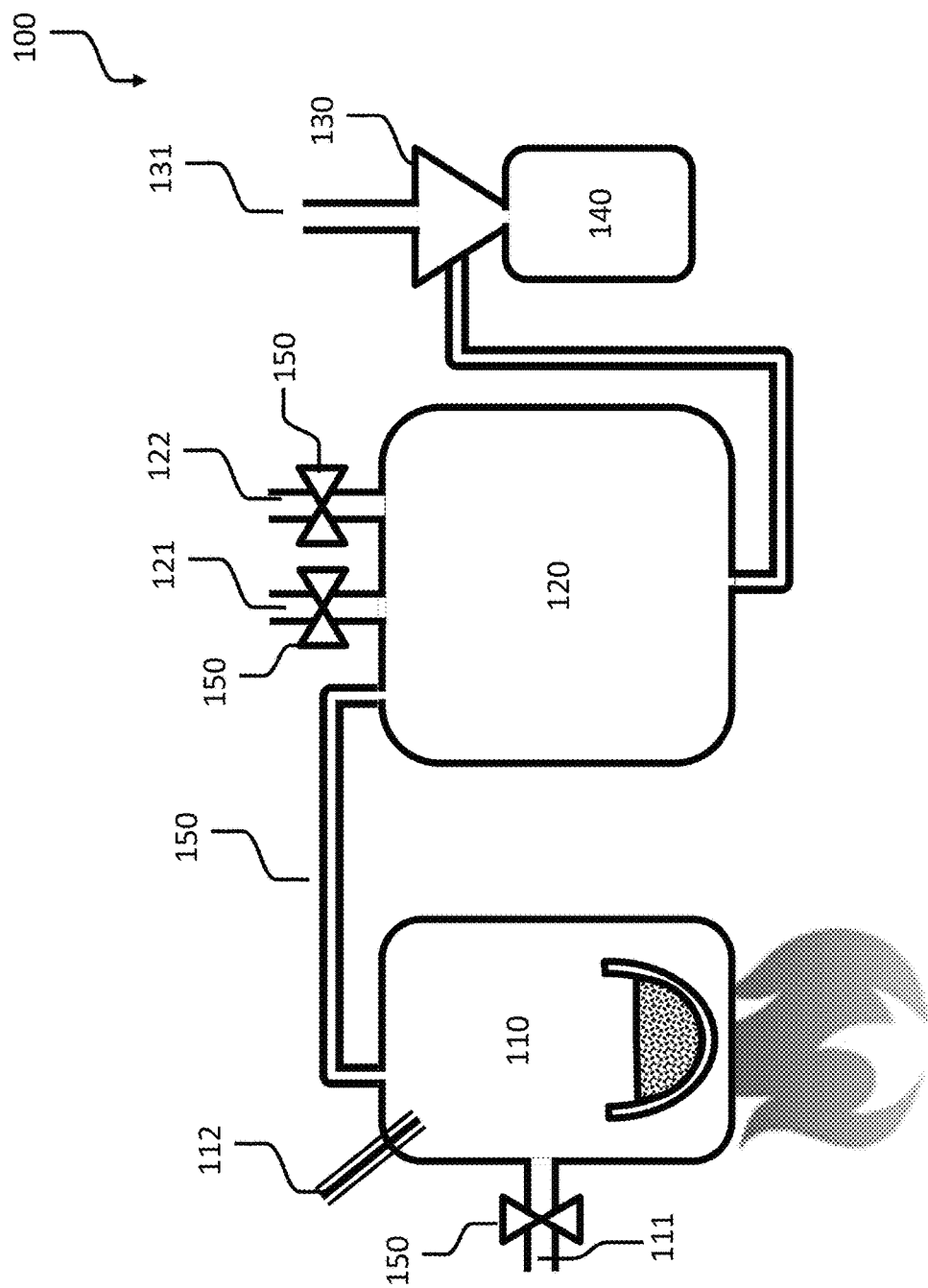
FIG. 1 shows a diagram of an exemplary apparatus for thermal reduction, per one or more embodiments herein.

The first graphene samples were obtained by peeling off a single layer of graphite using Scotch tape. While this process is simple and straightforward, it is not practical for large scale graphene manufacture. While graphene can be formed by the exfoliation of expanded graphite, such methods often form multilayered graphene platelets, with reduced surface area than graphene products formed of one or several layers. As surface area is critical for many applications. Without a large surface area, graphene loses many of its coveted properties, and behaves more like graphite.

As such, provided herein are methods and systems for the preparation of reduced graphene oxide (RGO) and activated reduced graphene oxide (ARGO) on a large scale and at a high throughput. The methods and systems disclosed herein form RGO and ARGO with a controllable and precise carbon/oxygen content, sheet size, form (e.g. powder, paste, and dispersion), concentration, pH, or any combination thereof based on its intended purpose. The methods and systems disclosed herein enable high throughput production of RGO and ARGO with a high surface area, superior optical properties, or both.

The high purity, low oxygen content, dispersibility, and single-layer morphology of the RGO and ARGO produced by the methods disclosed herein enables their use for improved energy storage devices (e.g. batteries, supercapacitors, fuel cells), hydrogen storage, electronics, RFID antennas, transparent electrodes, conductive coatings, conductive inks, conductive films, anti-corrosion coatings, anti-static coatings, membranes, filters, biomechanical components, sensors, gas separators, surfactants, lubricants, and many other applications.

Activation of Graphene Oxide

Provided herein are methods for forming activated graphene oxide. In some embodiments, the method comprises: (a) heating a first solution comprising an etchant and a graphene oxide solution; (b) cooling the first solution; (c) filtering and washing the first solution; and (d) spray drying the first solution. Graphene oxide activation can be used to create in-plane defects within individual graphene oxide sheets. The number and/or size of these defects in the sheets can be modulated through this activation step, for example, by modulating the reaction temperature and/or concentration of etchant.

In some embodiments, the first solution has a concentration of graphene oxide of about 1 mg/ml to about 20 mg/ml. In some embodiments, the first solution has a concentration of graphene oxide of at least about 1 mg/ml, 2 mg/ml, 3 mg/ml, 4 mg/ml, 6 mg/ml, 8 mg/ml, 10 mg/ml, 12 mg/ml, 14 mg/ml, 16 mg/ml, 18 mg/ml, or more, including increments therein. In some embodiments, the first solution has a concentration of graphene oxide of at most about 2 mg/ml, 3 mg/ml, 4 mg/ml, 6 mg/ml, 8 mg/ml, 10 mg/ml, 12 mg/ml, 14 mg/ml, 16 mg/ml, 18 mg/ml, 20 mg/ml, or more, including increments therein. In some embodiments, the first solution has a concentration by volume of the etchant of about 60% to about 98%. In some embodiments, the first solution has a concentration by volume of the etchant of at least about 60%, 65%, 70%, 75%, 80%, 85%, 90%, 95%, or more, including increments therein. In some embodiments, the first solution has a concentration by volume of the etchant of at most about 65%, 70%, 75%, 80%, 85%, 90%, 95%, 98%, or more, including increments therein. In some embodiments, the concentration by volume of the etchant in the first solution dictates a size and/or density of the defects in the graphene sheets. In some embodiments, the concentrations of the graphene oxide, the etchant or both affect the oxygen content of the AGO.

In some embodiments, the first solution is heated to a temperature of about 60° C. to about 120° C. In some embodiments, the first solution is heated to a temperature of at least about 60° C., 70° C., 80° C., 90° C., 100° C., 110° C., or more, including increments therein. In some embodiments, the first solution is heated to a temperature of at most about 70° C., 80° C., 90° C., 100° C., 110° C., 120° C. or more, including increments therein. In some embodiments, the first solution is cooled to a temperature of about 70° C. to about 90° C. In some embodiments, the first solution is cooled to a temperature of at least about 70° C., 75° C., 80° C., 85° C., or more including increments therein. In some embodiments, the first solution is cooled to a temperature of at most about 75° C., 80° C., 85° C., 90° C., or more including increments therein. In some embodiments, the heating and/or cooling temperature affect the water content and thus the oxygen content of the AGO.

In some embodiments, filtering the first solution is performed with a filter having a mesh size of about 0.5 μm to about 3 μm. In some embodiments, filtering the first solution is performed with a filter having a mesh size of at least about 0.5 μm, 1 μm, 1.5 μm, 2 μm, 2.5 μm, or more, including increments therein. In some embodiments, filtering the first solution is performed with a filter having a mesh size of at most about 1 μm, 1.5 μm, 2 μm, 2.5 μm, 3 μm, or more, including increments therein. In some embodiments, the filter comprises two or more filtering layers. In some embodiments, the filter comprises at least 1, 2, 3, 4, 5, 6, 7, 8, 9, or 10 filter layers. In some embodiments, the at least one mesh filter layer is metal. In some embodiments, the filter comprises a vacuum filter. In some embodiments, the vacuum filter comprises at least one spray bar assembly positioned to dispense at least one of the first solution and a wash liquid onto the filter. In some embodiments, the vacuum filter comprises a vacuum source configured to apply negative pressure to the filter to enhance filtration. In some embodiments, the vacuum filter comprises a pH sensor for measuring a pH of the first solution. In some embodiments, the filtered and washed first solution has a pH of about 1 to about 5. In some embodiments, the filtered and washed first solution has a pH of at least about 1, 1.5, 2, 2.5, 3, 3.5, 4, 4.5, or more including increments therein. In some embodiments, the filtered and washed first solution has a pH of at most about 1.5, 2, 2.5, 3, 3.5, 4, 4.5, 5, or more including increments therein. In some embodiments, the pH of the first solution, the filtration methods, or both dictate a size and/or density of the defects in the graphene sheets In some embodiments, the spray drying is performed by passing the first solution through a spray drying nozzle. In some embodiments, the spray drying nozzle is an ultrasonic nozzle, wherein the first solution passes therethrough at a velocity greater than the speed of sound in the first solution. In some embodiments, the spray drying nozzle is a subsonic nozzle, wherein the first solution passes therethrough at a velocity less than the speed of sound in the first solution. In some embodiments, the spray drying nozzle is a plain-orifice nozzle which atomizes the first solution. In some embodiments, the spray drying nozzle has a pressure-swirl spray to reduce a particle size of the first solution. In some embodiments, the spray drying nozzle is a single-effect nozzle. In some embodiments, the spray drying nozzle is multiple-effect nozzle. In some embodiments, the spray drying nozzle comprises an atomizer.

In some embodiments, the spray drying is performed at a flow rate of about 1 ml/hr to about 6,000 ml/hr. In some embodiments, the spray drying is performed at a flow rate of at least about 1 ml/hr, 5 ml/hr, 10 ml/hr, 50 ml/hr, 100 ml/hr, 500 ml/hr, 1,000 ml/hr, 2,000 ml/hr, 4,000 ml/hr, or more including increments therein. In some embodiments, the spray drying is performed at a flow rate of at most about 5 ml/hr, 10 ml/hr, 50 ml/hr, 100 ml/hr, 500 ml/hr, 1,000 ml/hr, 2,000 ml/hr, 4,000 ml/hr, 6,000 ml/hr, or more including increments therein. In some embodiments, the spray drying is performed at a pressure of about 10 psi to about 50 psi. In some embodiments, the spray drying is performed at a pressure of at least about 10 psi, 15 psi, 20 psi, 25 psi, 30 psi, 35 psi, 40 psi, 45 psi, or more including increments therein. In some embodiments, the spray drying is performed at a pressure of at most about 15 psi, 20 psi, 25 psi, 30 psi, 35 psi, 40 psi, 45 psi, 50 psi, or more including increments therein. In some embodiments, the spray drying is performed with an inlet temperature of about 120° C. to about 200° C. In some embodiments, the spray drying is performed with an inlet temperature of at least about 120° C., 130° C., 140° C., 150° C., 160° C., 170° C., 180° C., 190° C., or more including increments therein. In some embodiments, the spray drying is performed with an inlet temperature of at most about 130° C., 140° C., 150° C., 160° C., 170° C., 180° C., 190° C., 200° C., or more including increments therein. In some embodiments, an outlet temperature of the spray drying is about 30° C. to about 80° C. In some embodiments, an outlet temperature of the spray drying is at least about 30° C., 40° C., 50° C., 60° C., 70° C., or more including increments therein. In some embodiments, an outlet temperature of the spray drying is at most about 40° C., 50° C., 60° C., 70° C., 80° C., or more including increments therein.

In some embodiments, heating the first solution comprises stirring the first solution. In some embodiments, the annealing is performed in air, nitrogen, argon, or any combination thereof. In some embodiments, the first solution is cooled by adding ice to the first solution. In some embodiments, the etchant comprises hydrogen peroxide, bromine, iodine, potassium permanganate, potassium chlorate, potassium dichromate, manganese oxide, iron(iii) chloride, sodium peroxide, potassium persulfate, hypochlorous acid, or any combination thereof.

In some embodiments, the method further comprises dispersing the AGO in a solvent medium. In some embodiments, the solvent medium comprises a polar solvent. In some embodiments, the solvent comprises an organic or aqueous solvent. In some embodiments, the solvent comprises n-methyl-2-pyrrolidone (NMP), dimethylformamide (DMF), tetrahydrofuran (THF), chloroform, dichlorobenzene, or any combination thereof . In some embodiments, the method further comprises applying a mechanical force by, for example, as shear mixing, ultrasonic agitation, ball milling, or any combination thereof.

In some embodiments, dispersing the AGO a solvent medium comprises sonication of the AGO and the solvent medium for about 2 minutes to about 60 minutes. In some embodiments, dispersing the AGO a solvent medium comprises sonication of the AGO and the solvent medium for at least about 2 minutes, 5 minutes, 10 minutes, 20 minutes, 30 minutes, 40 minutes, 50 minutes, or more including increments therein. In some embodiments, dispersing the AGO a solvent medium comprises sonication of the AGO and the solvent medium for at most about 5 minutes, 10 minutes, 20 minutes, 30 minutes, 40 minutes, 50 minutes, 60 minutes, or more including increments therein. In some embodiments, the method further comprises dispersing the AGO a solvent medium at a concentration of at most about 0.5 mg/mL.

While graphene may be difficult to disperse in a solvent medium, the oxygen-containing functionalities of the AGO herein enables its dispersion in a polar solvent. In some embodiments, the AGO herein is dispersed in an organic or aqueous solvent (e.g. n-methyl-2-pyrrolidone (NMP), dimethylformamide (DMF), tetrahydrofuran (THF), chloroform and dichlorobenzene) by adding a surfactant and applying a mechanical force by, for example, as shear mixing, ultrasonic agitation, ball milling, or any combination thereof.

Morphology of Activated Graphene Oxide

In some embodiments, the AGO has a morphology comprising a nanoplate, a nanosheet, a nanoparticle, a nanoflake, a nanoplatelet, or any combination thereof. In some embodiments, the AGO is odorless. In some embodiments, the AGO has a brown or golden brown color.

In some embodiments, at least about 70%, 75%, 80%, 85%, 90%, 95%, or more, including increments therein of the AGO is formed of a single carbon layer. In some embodiments, at least about 70%, 75%, 80%, 85%, 90%, 95%, or more, including increments therein of the AGO is formed of only a single carbon layer. In some embodiments, the methods described herein enable the high concentrations of single layer carbon in the AGO produced thereby.

FIG. 2A shows a first atomic force microscopy (AFM) image an exemplary AGO deposited on a mica substrate indicate. As shown therein, the exemplary AGO has been exfoliated down to the monolayer level, wherein detected bilayer areas are mostly self-folding single layers. The thickness of the AGO seen therein is about 0.7 nm to about 2 nm, including the surface functional groups. In some embodiments, the AGO has a thickness of a single carbon atom. In some embodiments, the AGO has a thickness of at most about 2 nm, 1.5 nm, 1 nm, 0.9 nm, 0.8 nm, 0.7 nm, 0.6 nm, 0.5 nm, 0.4 nm, or 0.3 nm, including increments therein. In some embodiments, the reduced thickness of the AGO enables increased conductivity and surface area of the AGO.

Figure 3A:
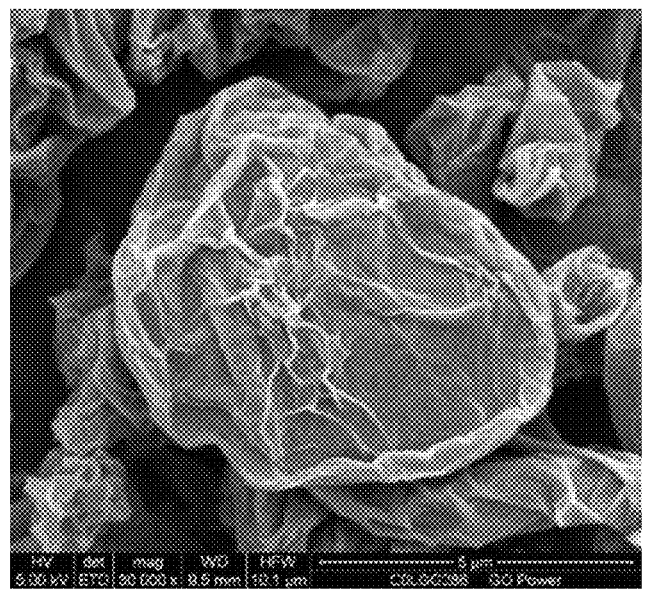
FIG. 3A shows a scanning electron microscopy (SEM) image of an exemplary AGO, per one or more embodiments herein.
Figure 3B:
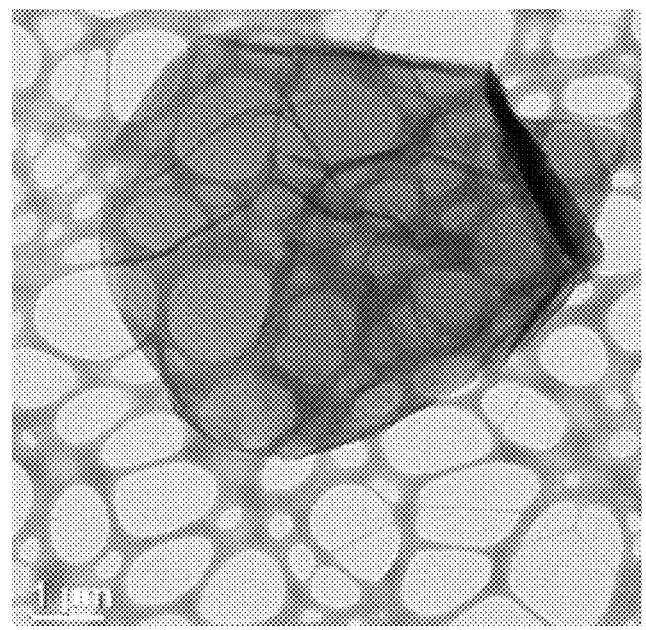
FIG. 3B shows a transmission electron microscopy (TEM) image of an exemplary AGO, per one or more embodiments herein.

In some embodiments, per FIGS. 2B and 2C, the particle size of the AGO ranges from about 0.1 μm to about 3.4 μm, with a median of about 0.75 μm. In some embodiments, the particle size of the AGO is at least about 0.1 μm, 0.25 μm, 0.5 μm, 0.75 μm, 1 μm, 1.25 μm, 1.5 μm, 2 μm, 2.5 μm, or about 3 μm including increments therein. In some embodiments, the particle size of the AGO is at most about 0.25 μm, 0.5 μm, 0.75 μm, 1 μm, 1.25 μm, 1.5 μm, 2 μm, 2.5 μm, 3 μm, or 3.5 μm, including increments therein. In some embodiments, the particle size of the AGO is measured as a mean particle size or a median particle size. In some embodiments, the particle size of the AGO is measured as a length, a width, or a diagonal length of the AGO particles. FIGS. 3A and 3B shows a scanning electron microscopy (SEM) and a transmission electron microscopy (TEM) images of a particle of an exemplary AGO, respectively. As shown therein, the particle of AGO has a size of about 6 μm and a crumpled morphology having a plurality of furrows and ridges. The transparency of the AGO particle in FIG. 3B, shows its carbon atom thickness. In some embodiments, the particle size directly influences the properties and applications of the AGO, such as surface area and conductivity.

Characterization of Activated Graphene Oxide

Figure 15A:
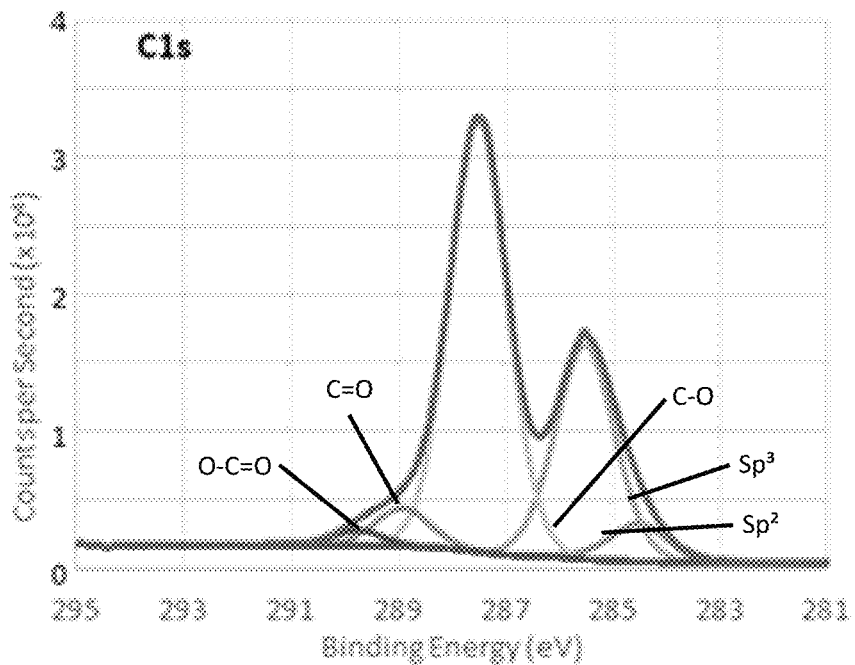
FIG. 15A shows an Cl spectrum graph of an exemplary AGO, per one or more embodiments herein.

Per FIG. 15A, the C1s spectrum of the exemplary Activated Graphene Oxide (AGO) can be deconvoluted into five peaks, each with a peak energy and a relative intensity. As shown, the five energy peaks for $sp^2$, $sp^3$, C—O, C=O, and O—C=O bonds are 284.5 eV, 285.5 eV, 287.5 eV, 288.9 eV, and 289.8 eV, respectively. Further, as shown the relative intensities, which correlate to the contribution of each functional group, for the $sp^2$, $sp^3$, C—O, C=O, and O—C=O bonds are 4.9%, 30.2%, 57.1%, 3.2%, and 3.5%, respectively.

Figure 15B:
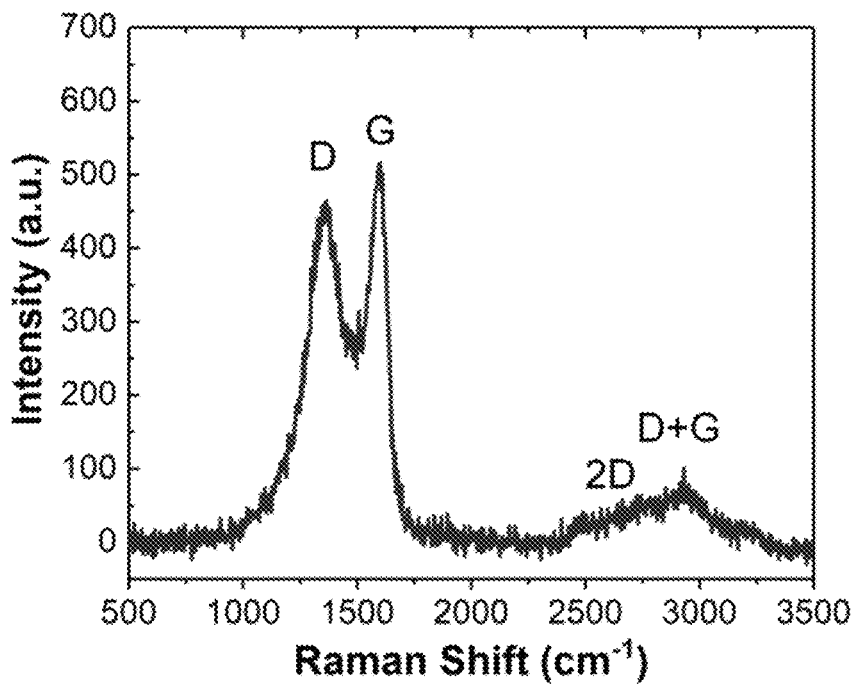
FIG. 15B shows a Raman spectroscopy graph of an exemplary AGO, per one or more embodiments herein.

FIG. 15B shows a Raman spectroscopy graph of an exemplary AGO, showing a "D" peak peaks at about 1350 cm-1 with an intensity of about 460 au, and a "G" peak at about 1600 cm-1 with an intensity of about 515 au. The D and G peaks correspond to $sp^3$ and $sp^2$ hybridized carbons, respectively, wherein a ratio between the intensities of the D and G peaks corresponds to a defect density of the AGO. In this example, the D:G ratio is about 1:1.2 displaying a defect density of about 0.8.

In some embodiments, such defects act as electron transfer sites and enable lithium ions to flow therethrough. As such, the defect density of the AGO enables the formation of electrodes and energy storage devices with improved charge/discharge kinetics, charge cycling capabilities, and electro-activity. In some embodiments, defect density is inversely proportional to crystallinity and electron mobility of the AGO.

In some embodiments, the AGO has a D:G ratio of about 0.1:1 to about 1:5. In some embodiments, the AGO has a D:G ratio of at least about 0.1:1, 0.3:1, 0.5:1, 0.8:1, 1:1, 1:1.2, 1:1.5, 1:1.8, 1:2, 1:3, 1:4, or about 1:5. In some embodiments, the AGO has a D:G ratio of no more than about 0.1:1, 0.3:1, 0.5:1, 0.8:1, 1:1, 1:1.2, 1:1.5, 1:1.8, 1:2, 1:3, 1:4, or about 1:5.

In some embodiments, the AGO has a defect density of about 0.1 to about 1.5. In some embodiments, the AGO has a defect density of about 0.1 to about 0.2, about 0.1 to about 0.3, about 0.1 to about 0.4, about 0.1 to about 0.5, about 0.1 to about 0.6, about 0.1 to about 0.7, about 0.1 to about 0.8, about 0.1 to about 0.9, about 0.1 to about 1, about 0.1 to about 1.2, about 0.1 to about 1.5, about 0.2 to about 0.3, about 0.2 to about 0.4, about 0.2 to about 0.5, about 0.2 to about 0.6, about 0.2 to about 0.7, about 0.2 to about 0.8, about 0.2 to about 0.9, about 0.2 to about 1, about 0.2 to about 1.2, about 0.2 to about 1.5, about 0.3 to about 0.4, about 0.3 to about 0.5, about 0.3 to about 0.6, about 0.3 to about 0.7, about 0.3 to about 0.8, about 0.3 to about 0.9, about 0.3 to about 1, about 0.3 to about 1.2, about 0.3 to about 1.5, about 0.4 to about 0.5, about 0.4 to about 0.6, about 0.4 to about 0.7, about 0.4 to about 0.8, about 0.4 to about 0.9, about 0.4 to about 1, about 0.4 to about 1.2, about 0.4 to about 1.5, about 0.5 to about 0.6, about 0.5 to about 0.7, about 0.5 to about 0.8, about 0.5 to about 0.9, about 0.5 to about 1, about 0.5 to about 1.2, about 0.5 to about 1.5, about 0.6 to about 0.7, about 0.6 to about 0.8, about 0.6 to about 0.9, about 0.6 to about 1, about 0.6 to about 1.2, about 0.6 to about 1.5, about 0.7 to about 0.8, about 0.7 to about 0.9, about 0.7 to about 1, about 0.7 to about 1.2, about 0.7 to about 1.5, about 0.8 to about 0.9, about 0.8 to about 1, about 0.8 to about 1.2, about 0.8 to about 1.5, about 0.9 to about 1, about 0.9 to about 1.2, about 0.9 to about 1.5, about 1 to about 1.2, about 1 to about 1.5, or about 1.2 to about 1.5, including increments therein. In some embodiments, the AGO has a defect density of about 0.1, about 0.2, about 0.3, about 0.4, about 0.5, about 0.6, about 0.7, about 0.8, about 0.9, about 1, about 1.2, or about 1.5. In some embodiments, the AGO has a defect density of at least about 0.1, about 0.2, about 0.3, about 0.4, about 0.5, about 0.6, about 0.7, about 0.8, about 0.9, about 1, or about 1.2. In some embodiments, the AGO has a defect density of at most about 0.2, about 0.3, about 0.4, about 0.5, about 0.6, about 0.7, about 0.8, about 0.9, about 1, about 1.2, or about 1.5.

Figure 16A:
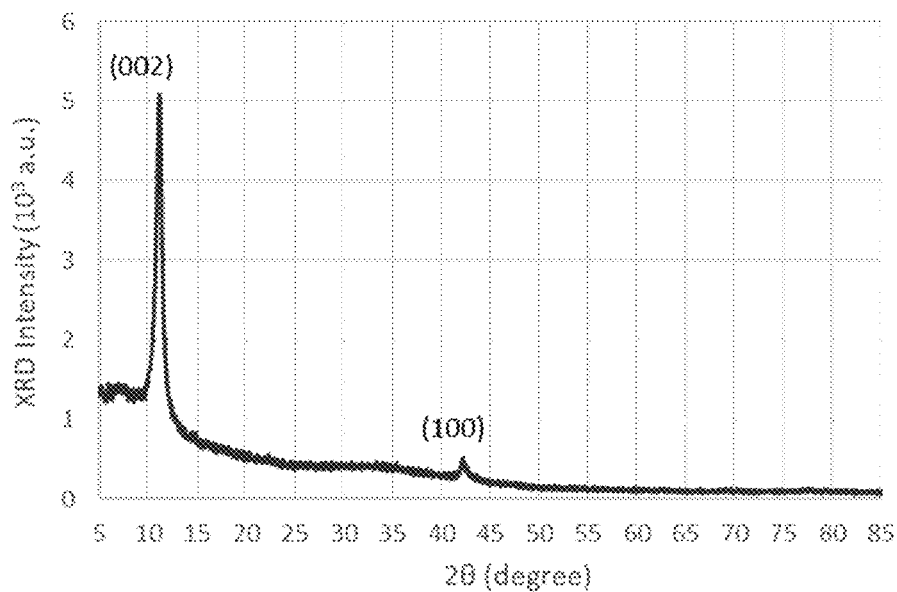
FIG. 16A shows a first X-ray Powder Diffraction (XRD) graph of an exemplary AGO, per one or more embodiments herein.
Figure 16B:
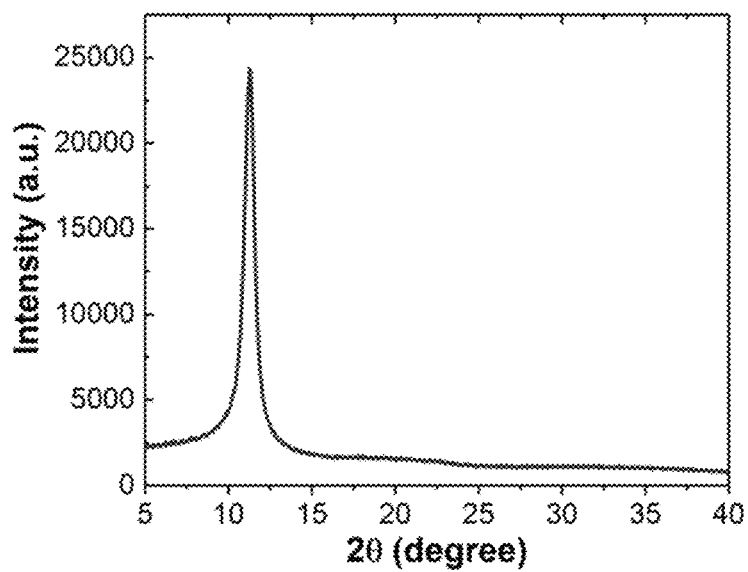
FIG. 16B shows a second XRD graph of an exemplary AGO, per one or more embodiments herein.
Figure 17A:
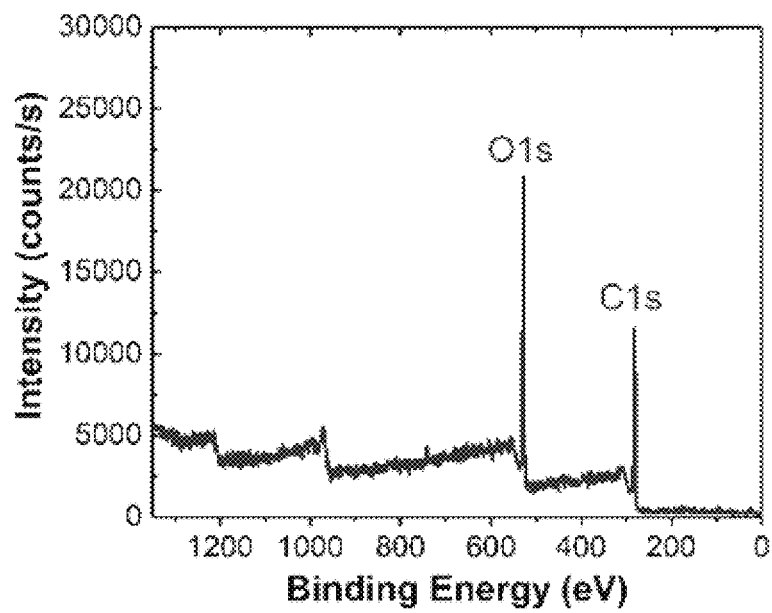
FIG. 17A shows a first X-ray Photoelectron spectroscopy (XPS) graph of an exemplary AGO, per one or more embodiments herein.
Figure 17B:
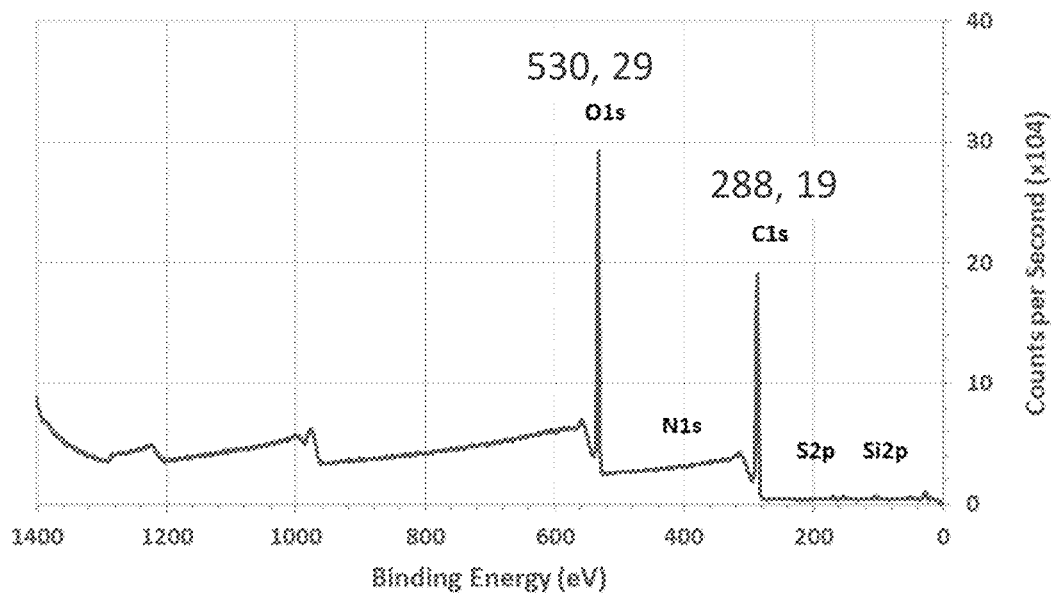
FIG. 17B shows a second XPS graph of an exemplary AGO, per one or more embodiments herein.

X-ray Powder Diffraction (XRD) graphs, per FIGS. 16A and 16B, display XRD peaks at 2θ of about 11°, which corresponds to an interlayer spacing of about 0.78 nm due to the introduction of oxygen functional groups, and at about 26°, which shows that as 0.34 nm graphite stacking is absent, the exemplary AGO is effective exfoliated. Effective exfoliation increases the surface area and conductivity of the AGO. Further the X-ray Photoelectron spectroscopy (XPS) graphs, per FIGS. 16A and 16B, show a high carbon content of about 70.8%, a high oxygen content of about 27.8%, and a low concentration of nitrogen and other impurities of less than about 1.4% of other elements within the exemplary AGO. Such high carbon content and low impurity content enables the high conductivity and energy storage characteristics of the exemplary AGO. An analysis of an exemplary AGO is shown per Table 1 below.

TABLE 1

| Element | Atomic Percentage | Weight Percentage |
|---|---|---|
| Carbon | 60-75 | 35-60 |
| Hydrogen | <3 | 0-3 |
| Nitrogen | <2 | 0-1 |
| Oxygen | 20-35 | 35-55 |

In some embodiments, the AGO has an atomic carbon content of at least about 40%, 45%, 50%, 55%, or more including increments therein. In some embodiments, the AGO has a carbon content by weight of at least about 60%, 65%, 70%, or more including increments therein. In some embodiments, the AGO has an atomic oxygen content of at least about 40%, 45%, 50%, 55%, or more including increments therein. In some embodiments, the AGO has an oxygen content by weight of at least about 20%, 25%, 30% or more including increments therein. In some embodiments, the high carbon content of the AGO herein enables greater electromobility and higher crystallinity of the carbon layers. In some embodiments, the high oxygen content of the AGO herein forms large quantities of oxygen functional groups, which ensure a sufficiently high interlayer spacing to enable exfoliation and prevent restacking. In some embodiments, the high carbon and oxygen content of the AGO herein shows reduced levels of impurities. Such high carbon content and low impurity content enables the high conductivity and energy storage characteristics of the exemplary AGO.

Figure 18A:
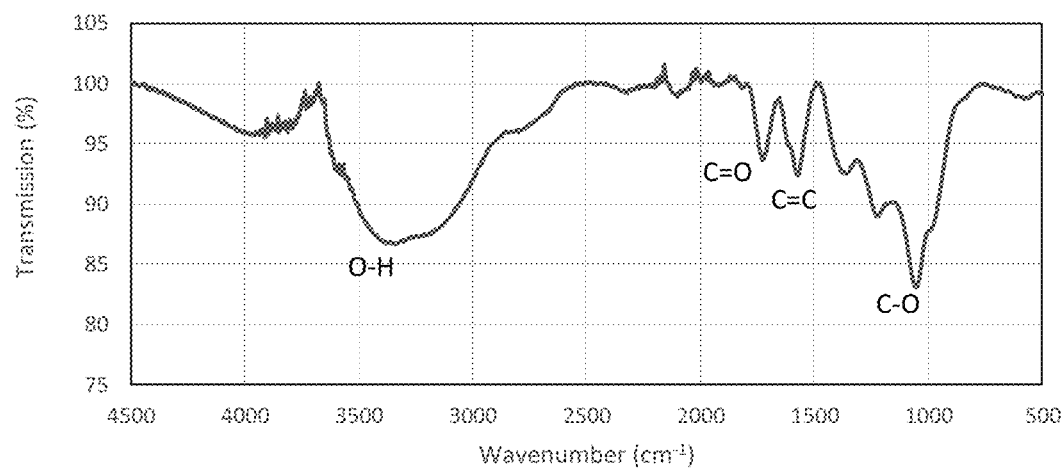
FIG. 18A shows a Fourier transform infrared (FTIR) graph of an exemplary AGO, per one or more embodiments herein.
Figure 18B:
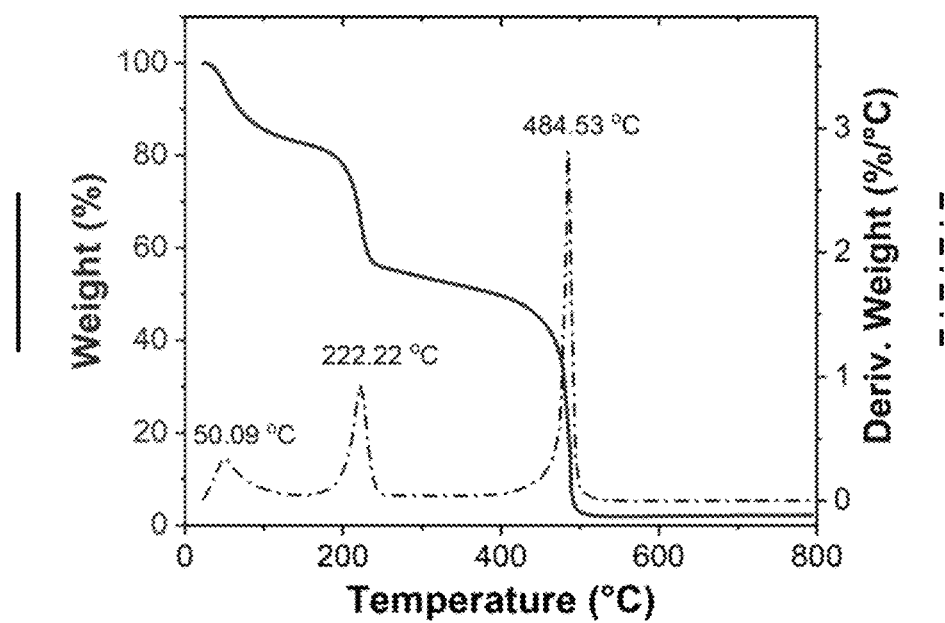
FIG. 18B shows a thermal analysis of an exemplary AGO, per one or more embodiments herein.

FIG. 18A shows a Fourier transform infrared (FTIR) graph of an exemplary AGO with O—H stretching at about 3350 cm$^{-2}$, C═O stretching at about 1720 cm$^{-2}$, aromatic C═C stretching at about 1570 cm$^{-2}$, and C—O stretching at about 1050 cm$^{-2}$. FIG. 18B shows a thermal analysis of an exemplary AGO, wherein the three peaks correspond to water loss, thermal reduction, and combustion, respectively.

TABLE 2

| | AGO | | |
|---|---|---|---|
| Appearance | Dispersion | Paste | Powder |
| Solvent | Water | Water | — |
| Solid Content (w/w) | 0.01-0.5 | 6-12 | — |
| pH of the product | 2-6 | 1-4 | — |
| Apparent density (g/cm$^3$) | 0.7$^{-2}$.5 | 0.7$^{-2}$.5 | 0.1-0.7 |
| Ash (wt %) | | <1.4 | |
| Lateral size of GO sheets (μm) | | 0.2-3 | |

Properties of an exemplary AGO are listed above in Table 2. In some embodiments, a percentage of the AGO that is monolayered is at least about 85%. In some embodiments, the AGO has a density of about 0.2 g/cm$^3$ to about 1.5 g/cm$^3$. In some embodiments, the AGO has a density of at most about 0.2 g/cm$^3$, 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, 1.4 g/cm$^3$, or 1.5 g/cm$^3$, including increments therein. In some embodiments, the low density and high surface area of the AGO herein enable the formation of electrodes in energy storage devices having high power and energy densities. In some embodiments, the AGO has a density of at least about 0.2 g/cm$^3$, 0.3 g/cm$^3$, 0.4 g/cm$^3$, 0.5 g/cm$^3$, 0.6 g/cm$^3$, 0.7 g/cm$^3$, 0.8 g/cm$^3$, 0.9 g/cm$^3$, 1.0 g/cm$^3$, 1.1 g/cm$^3$, 1.2 g/cm$^3$, 1.3 g/cm$^3$, or about 1.4 g/cm$^3$.

In some embodiments, the AGO has an average lateral dimension of about 0.2 μm to about 4 μm. In some embodiments, the AGO has an average lateral dimension of at least about 0.2 μm, 0.4 μm, 0.6 μm, 0.8 μm, 1 λm, 2 μm, 3 μm, or more, including increments therein. In some embodiments, the AGO has an average lateral dimension of at most about 0.4 μm, 0.6 μm, 0.8 μm, 1 μm, 2 μm, 3 μm, 4 μm, or more, including increments therein.

In some embodiments, the AGO has inter-plane pores having a size of about 0.5 nm to about 5 nm. In some embodiments, the AGO has inter-plane pores having a size of at least about 0.5 nm, 1 nm, 1.5 nm, 2 nm, 2.5 nm, 3 nm, 3.5 nm, 4 nm, 4.5 nm or more, including increments therein. %In some embodiments, the AGO has inter-plane pores having a size of at most about 1 nm, 1.5 nm, 2 nm, 2.5 nm, 3 nm, 3.5 nm, 4 nm, 4.5 nm, 5 nm, or more, including increments therein. In some embodiments, the inter-plane pore size affects the surface area and thus the conductivity of the AGO.

In some embodiments, the AGO has a surface area of about 450 m$^2$/g to about 1,500 m$^2$/g. In some embodiments, the AGO has a surface area of at least about 450 m$^2$/g, 500 m$^2$/g, 625 m$^2$/g, 750 m$^2$/g, 875 m$^2$/g, 1,000 m$^2$/g, 1,250 m$^2$/g, or more, including increments therein. In some embodiments, the increased surface area of the AGO herein increases the conductivity, the power density, the energy density, or any combination thereof of the AGO In some embodiments, the AGO has a carbon content by weight of about 65% to about 75%. In some embodiments, the AGO has a carbon content by weight of at least about 65%, 66%, 67%, 68%, 69%, 70%, 71%, 72%, 73%, 74%, or more, including increments therein. In some embodiments, the AGO has an oxygen content by weight of about 25% to about 30%. In some embodiments, the AGO has an oxygen content by weight of at least about 25%, 26%, 27%, 28%, 29%, or more, including increments therein. In some embodiments, the AGO has an oxygen content by weight of at most about 26%, 27%, 28%, 29%, 30%, or more, including increments therein. In some embodiments, the AGO has an ash content by weight of at most about 1.5%. In some embodiments, the high carbon content and low ash content reduces the resistance and thus increases the conductivity of the AGO.

In some embodiments, the AGO has an electromobility of about 1 cm$^2$/V/s to about 500 cm$^2$/V/s. In some embodiments, the AGO has an electromobility of about 1 cm$^2$/V/s to about 2 cm$^2$/V/s, about 1 cm$^2$/V/s to about 5 cm$^2$/V/s, about 1 cm$^2$/V/s to about 10 cm$^2$/V/s, about 1 cm$^2$/V/s to about 25 cm$^2$/V/s, about 1 cm$^2$/V/s to about 50 cm$^2$/V/s, about 1 cm$^2$/V/s to about 75 cm$^2$/V/s, about 1 cm$^2$/V/s to about 100 cm$^2$/V/s, about 1 cm$^2$/V/s to about 200 cm$^2$/V/s, about 1 cm$^2$/V/s to about 300 cm$^2$/V/s, about 1 cm$^2$/V/s to about 400 cm$^2$/V/s, about 1 cm$^2$/V/s to about 500 cm$^2$/V/s, about 2 cm$^2$/V/s to about 5 cm$^2$/V/s, about 2 cm$^2$/V/s to about 10 cm$^2$/V/s, about 2 cm$^2$/V/s to about 25 cm$^2$/V/s, about 2 cm$^2$/V/s to about 50 cm$^2$/V/s, about 2 cm$^2$/V/s to about 75 cm$^2$/V/s, about 2 cm$^2$/V/s to about 100 cm$^2$/V/s, about 2 cm$^2$/V/s to about 200 cm$^2$/V/s, about 300 cm$^2$/V/s to about 400 cm$^2$/V/s, about 2 cm$^2$/V/s to about 500 cm$^2$/V/s, about 5 cm$^2$/V/s to about 10 cm$^2$/V/s, about 5 cm$^2$/V/s to about 25 cm$^2$/V/s, about 5 cm$^2$/V/s to about 50 cm$^2$/V/s, about 5 cm$^2$/V/s to about 75 cm$^2$/V/s, about 5 cm$^2$/V/s to about 100 cm$^2$/V/s, about 5 cm$^2$/V/s to about 200 cm$^2$/V/s, about 5 cm$^2$/V/s to about 300 cm$^2$/V/s, about 5 cm$^2$/V/s to about 400 cm$^2$/V/s, about 5 cm$^2$/V/s to about 500 cm$^2$/V/s, about 10 cm$^2$/V/s to about 25 cm$^2$/V/s, about 10 cm$^2$/V/s to about 50 cm$^2$/V/s, about 10 cm$^2$/V/s to about 75 cm$^2$/V/s, about 10 cm$^2$/V/s to about 100 cm$^2$/V/s, about 10 cm$^2$/V/s to about 200 cm$^2$/V/s, about 10 cm$^2$/V/s to about 300 cm$^2$/V/s, about 10 cm$^2$/V/s to about 400 cm$^2$/V/s, about 10 cm$^2$/V/s to about 500 cm$^2$/V/s, about 25 cm$^2$/V/s to about 50 cm$^2$/V/s, about 25 cm$^2$/V/s to about 75 cm$^2$/V/s, about 25 cm$^2$/V/s to about 100 cm$^2$/V/s, about 25 cm$^2$/V/s to about 200 cm$^2$/V/s, about 25 cm$^2$/V/s to about 300 cm$^2$/V/s, about 25 cm$^2$/V/s to about 400 cm$^2$/V/s, about 25 cm$^2$/V/s to about 500 cm$^2$/V/s, about 50 cm$^2$/V/s to about 75 cm$^2$/V/s, about 50 cm$^2$/V/s to about 100 cm$^2$/V/s, about 50 cm$^2$/V/s to about 200 cm$^2$/V/s, about 50 cm$^2$/V/s to about 300 cm$^2$/V/s, about 50 cm$^2$/V/s to about 400 cm$^2$/V/s, about 50 cm$^2$/V/s to about 500 cm$^2$/V/s, about 75 cm$^2$/V/s to about 100 cm$^2$/V/s, about 75 cm$^2$/V/s to about 200 cm$^2$/V/s, about 75 cm$^2$/V/s to about 300 cm$^2$/V/s, about 75 cm$^2$/V/s to about 400 cm$^2$/V/s, about 75 cm$^2$/V/s to about 500 cm$^2$/V/s, about 100 cm$^2$/V/s to about 200 cm$^2$/V/s, about 100 cm$^2$/V/s to about 300 cm$^2$/V/s, about 100 cm$^2$/V/s to about 400 cm$^2$/V/s, about 100 cm$^2$/V/s to about 500 cm$^2$/V/s, about 200 cm$^2$/V/s to about 300 cm$^2$/V/s, about 200 cm$^2$/V/s to about 400 cm$^2$/V/s, about 200 cm$^2$/V/s to about 500 cm$^2$/V/s, about 300 cm$^2$/V/s to about 400 cm$^2$/V/s, about 300 cm$^2$/V/s to about 500 cm$^2$/V/s, or about 400 cm$^2$/V/s to about 500 cm$^2$/V/s, including increments therein. In some embodiments, the AGO has an electromobility of about 1 cm$^2$/V/s, about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, about 400 cm$^2$/V/s, or about 500 cm$^2$/V/s. In some embodiments, the AGO has an electromobility of at least about 1 cm$^2$/V/s, about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, or about 400 cm$^2$/V/s. In some embodiments, the AGO has an electromobility of at most about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, about 400 cm$^2$/V/s, or about 500 cm$^2$/V/s.

In some embodiments, the AGO has a conductivity of about 1,000 S/m to about 3,000 S/m. In some embodiments, the AGO has a conductivity of at least about 1,000 S/m, 1,250 S/m, 1,500 S/m, 1,750 S/m, 2,000 S/m, 2,250 S/m, 2,500 S/m, 2,750 S/m, or more, including increments therein. In some embodiments, the electromobility and conductivity of the AGO enables faster charge and greater energy storage.

Reduction of Activated Graphene Oxide

In some embodiments, the methods herein further comprise reducing the activated graphene oxide (AGO) to form a first activated reduced graphene oxide (ARGO). In some embodiments, the AGO is reduced by thermal reduction. In some embodiments, the method comprises chemical reduction of the AGO. In some embodiments, the AGO is not reduced by chemical reduction. In some embodiments, the methods of thermal reduction herein reduce the oxygen content of the AGO.

In some embodiments, the method comprises chemical reduction of AGO. In some embodiments, reducing the AGO comprises: heating a second solution comprising the AGO, a strong base and a reducing agent to the second solution, and optionally filtering and washing the reducing agent and the second solution. In some embodiments, the strong base comprises sodium hydroxide, ammonium hydroxide, potassium hydroxide, urea, melamine, sodium carbonate, or any combination thereof. In some embodiments, the reducing agent comprises ascorbic acid, hydrazine, sodium borohydride, pyrogallol, lithium aluminum hydride, ammonia borane, thiourea dioxide, hydroiodic acid, hydrogen bromide, ethanethiol-aluminum chloride, Lawesson's reagent, sodium bisulfite, sodium dithionite, aluminum, iron, zinc, magnesium, or any combination thereof In some embodiments, reducing the AGO comprises annealing the spray dried first solution. In some embodiments, the annealing is performed by a flame torch, a heating strip, a heating coil, or any combination thereof. In some embodiments, the annealing is performed in air, nitrogen, argon, or any combination thereof. In some embodiments, the annealing is performed at a temperature of less than about 3,000° C., 2,500° C., 2,000° C., including increments therein. In some embodiments, reducing the AGO does not comprise annealing the spray dried first solution. In some embodiments, the annealing is performed at a temperature of about 150° C. to about 1,500° C. In some embodiments, the annealing is performed at a temperature of at least about 150° C., 250° C., 500° C., 750° C., 1,000° C., or 1,250° C., including increments therein. In some embodiments, the annealing is performed at a temperature of at most about 250° C., 500° C., 750° C., 1,000° C., or 1,250° C., or 1,500° C., including increments therein. In some embodiments, annealing occurs for a period of time of about 1 minute to about 1,500 minutes. In some embodiments, the annealing temperature, means, time, or any combination thereof affect the ignition, explosion, and expansion, and thus the morphology, of the AGO. In some embodiments, reducing the AGO comprises an initial thermal expansion followed by annealing. The annealing step can improve the properties of the AGO such as surface area and conductivity. In some embodiments, annealing the activated graphene oxide removes oxygen functional groups therein. In some embodiments, annealing the activated graphene oxide removes oxygen functional groups therein by about 25% to about 75%. In some embodiments, removing the oxygen functional groups from the activated graphene oxide increases its conductivity. In some embodiments, removing the oxygen functional groups from the activated graphene oxide increases its conductivity by about 75% to about 125%. In some embodiments, annealing the activated graphene oxide increases its surface area. In some embodiments, annealing the activated graphene oxide increases its surface area by about 75% to about 125%. In one example, annealing the activated graphene oxide increases its surface area from about 350 m$^2$/g to 700 m$^2$/g, and reduces its oxygen content from about 30% to about 16% which increases its conductivity from about 50 S/m to about 100 S/m.

In some embodiments, the drying occurs for a period of time of about 3 minutes to about 60 minutes. In some embodiments, the drying occurs for a period of time of at least about 3 minutes, 5 minutes, 10 minutes, 20 minutes, 30 minutes, 40 minutes, 50 minutes, or more including increments therein. In some embodiments, the drying occurs for a period of time of at most about 5 minutes, 10 minutes, 20 minutes, 30 minutes, 40 minutes, 50 minutes, 60 minutes, or more including increments therein. In some embodiments, the second solution is heated to a temperature of about 60° C. to about 120° C. In some embodiments, the second solution is heated to a temperature of at least about 60° C., 70° C., 80° C., 90° C., 100° C., 110° C., or more including increments therein. In some embodiments, the second solution is heated to a temperature of at most about 70° C., 80° C., 90° C., 100° C., 110° C., 120° C., or more including increments therein. In some embodiments, filtering and washing the second solution occurs within a period of time after the addition of the reducing agent to the second solution of about 0.5 hours and 10 hours. In some embodiments, filtering and washing the second solution occurs when the second solution has a pH of about 8 to about 11.

FIG. 1 shows an exemplary apparatus for thermal reduction of AGO. As shown, in some embodiments, the nitrogen from a first nitrogen inlet 111 is fed into a heating chamber (e.g., an oven or thermal reactor) 110 comprising the AGO, wherein a thermocouple measures the temperature inside the heating chamber 110. The heated AGO rises out from the heating chamber 110 into a collection chamber 120 comprising a compressed air inlet 121 and a second nitrogen inlet 122. A cyclone 130 comprising an exhaust filter 131 sucks the ARGO out of the collection chamber 120 and into a collection bag 140. In some embodiments, one or more of the first nitrogen inlet 111, the second nitrogen inlet 122, and the compressed air inlet 121 is fluidically sealed by a valve 150. In some embodiments, the connection between the heating chamber 110 and the collection chamber 120 is sealed by a valve 150.

In some embodiments, reducing the AGO comprises the methods of thermal reduction as described above to form the first ARGO, and microwaving the first ARGO to form a second ARGO. In some embodiments, the second ARGO has a reduced oxygen content compared to the first ARGO. In some embodiments, the microwaving occurs over a period of time of about 10 seconds to about 60 seconds. In some embodiments, the microwaving occurs at a power of about 500 W to about 2,000 W. In some embodiments, the microwaving occurs at a power of at least about 500 W, 750 W, 1,000 W, 1,250 W, 1,500 W, 1,750 W, or more, including increments therein. In some embodiments, the microwaving time, wattage, or both affect the ignition, explosion, and expansion, and thus the morphology, of the AGO.

In some embodiments, the method further comprises dispersing the first ARGO, the second ARGO, or both, in a solvent medium. In some embodiments, the method further comprises dispersing the first ARGO, the second ARGO, or both, in the solvent medium at a concentration of at most about 0.5 mg/mL. In some embodiments, the solvent medium comprises a polar solvent. In some embodiments, the solvent comprises an organic or aqueous solvent (e.g. NMP, DMF, THF, chloroform and dichlorobenzene). In some embodiments, the method further comprises applying a mechanical force by, for example, as shear mixing, ultrasonic agitation, ball milling, or any combination thereof to the dispersion of the first ARGO, the second ARGO, or both.

Morphology of Activated Reduced Graphene Oxide

In some embodiments, the first and/or second activated reduced graphene oxide (ARGO) has a morphology comprising a nanoplate, a nanosheet, a nanoparticle, a nanoflake, a nanoplatelet, or any combination thereof. In some embodiments, the ARGO is odorless. In some embodiments, the ARGO has a black color.

Figure 4A:
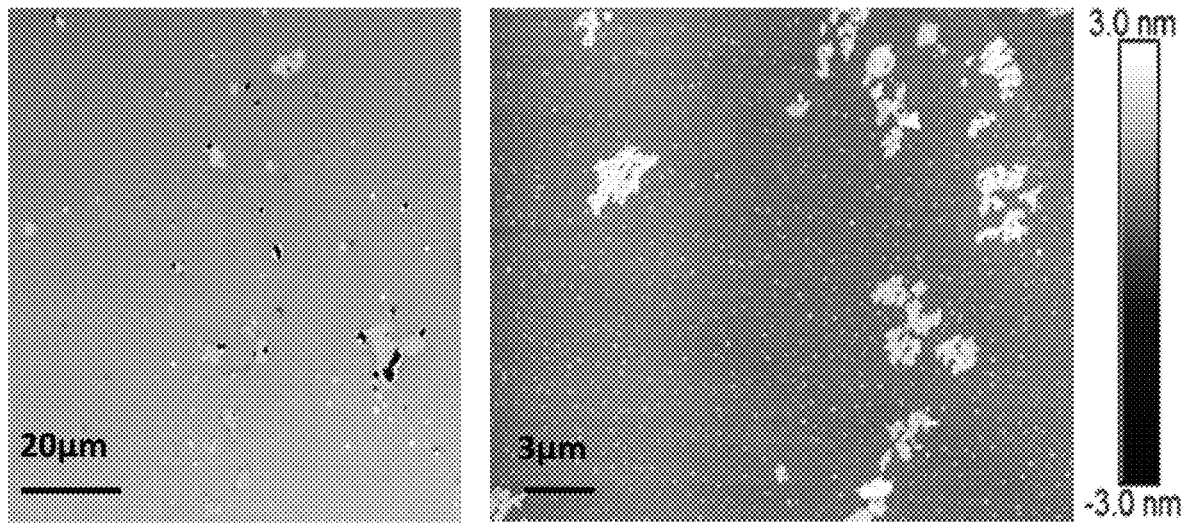
FIG. 4A shows a first set of visual microscopy images at low and high magnifications of an exemplary first activated reduced graphene oxide (ARGO), per one or more embodiments herein.
Figure 4B:
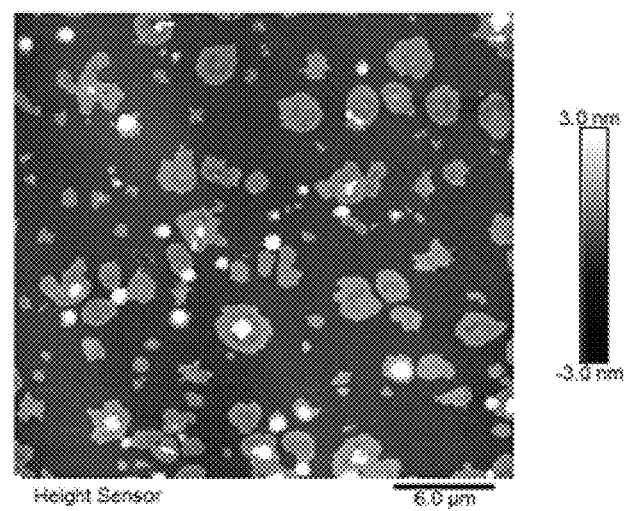
FIG. 4B shows a second set of visual microscopy images at low and high magnifications of an exemplary ARGO, per one or more embodiments herein.

FIGS. 4A and 4B show two sets of visual microscopy images at low and high magnifications of an exemplary first activated reduced graphene oxide (ARGO). The optical microscopy images (left) and the AFM images (right) display the single layer nature, topography, and average particle size of the first ARGO herein. As shown therein, the particles have a size ranging from about 1 μm to about 5 μm and have a thickness of less than about 3 nm.

Figure 5A:
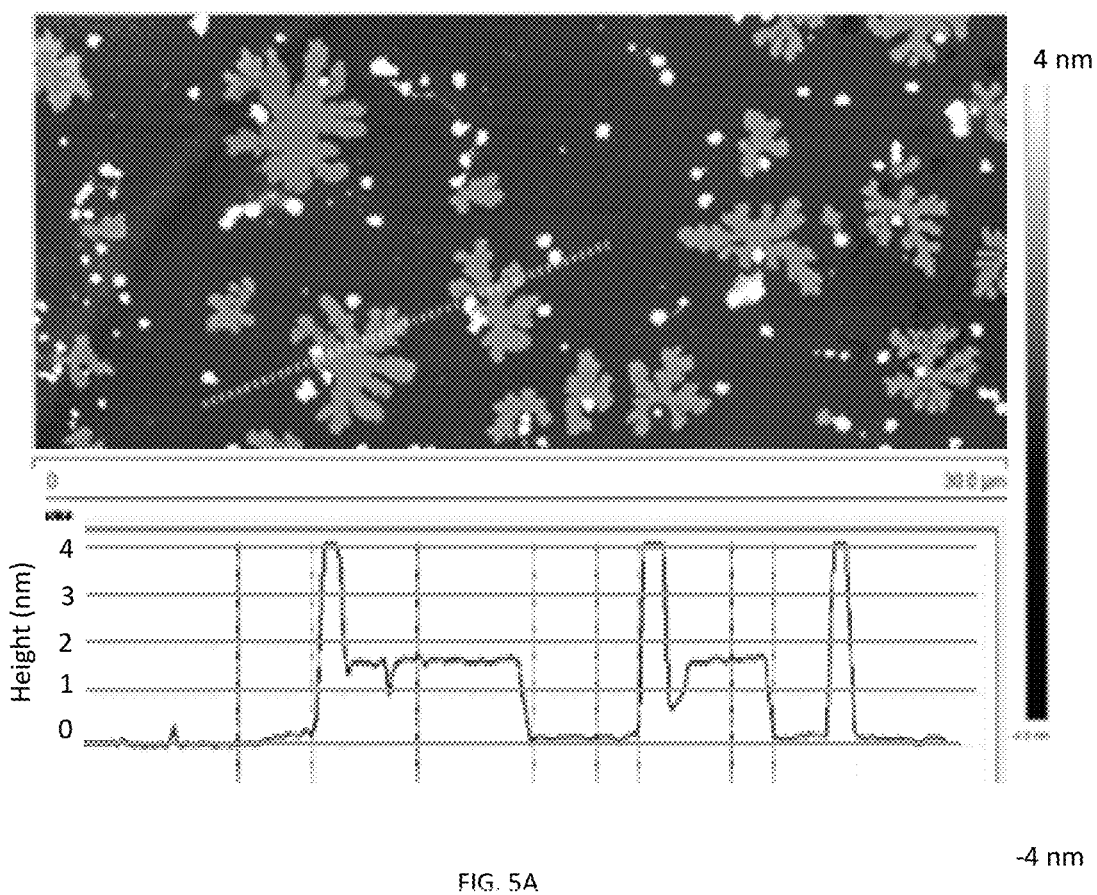
FIG. 5A shows an AFM image an exemplary first ARGO, per one or more embodiments herein.
Figure 5B:
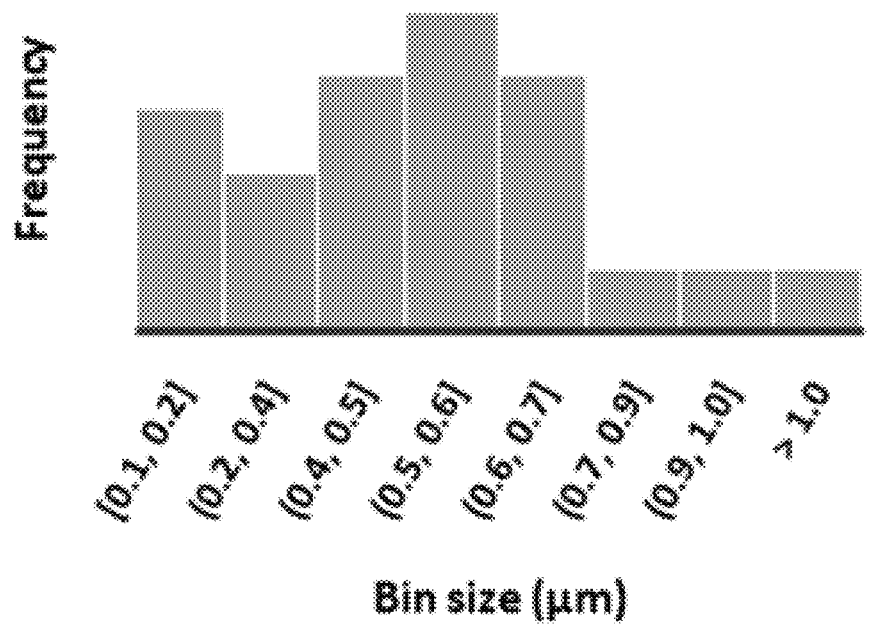
FIG. 5B shows a particle size distribution graph of the exemplary first ARGO of FIG. 6A, per one or more embodiments herein.
Figure 6:
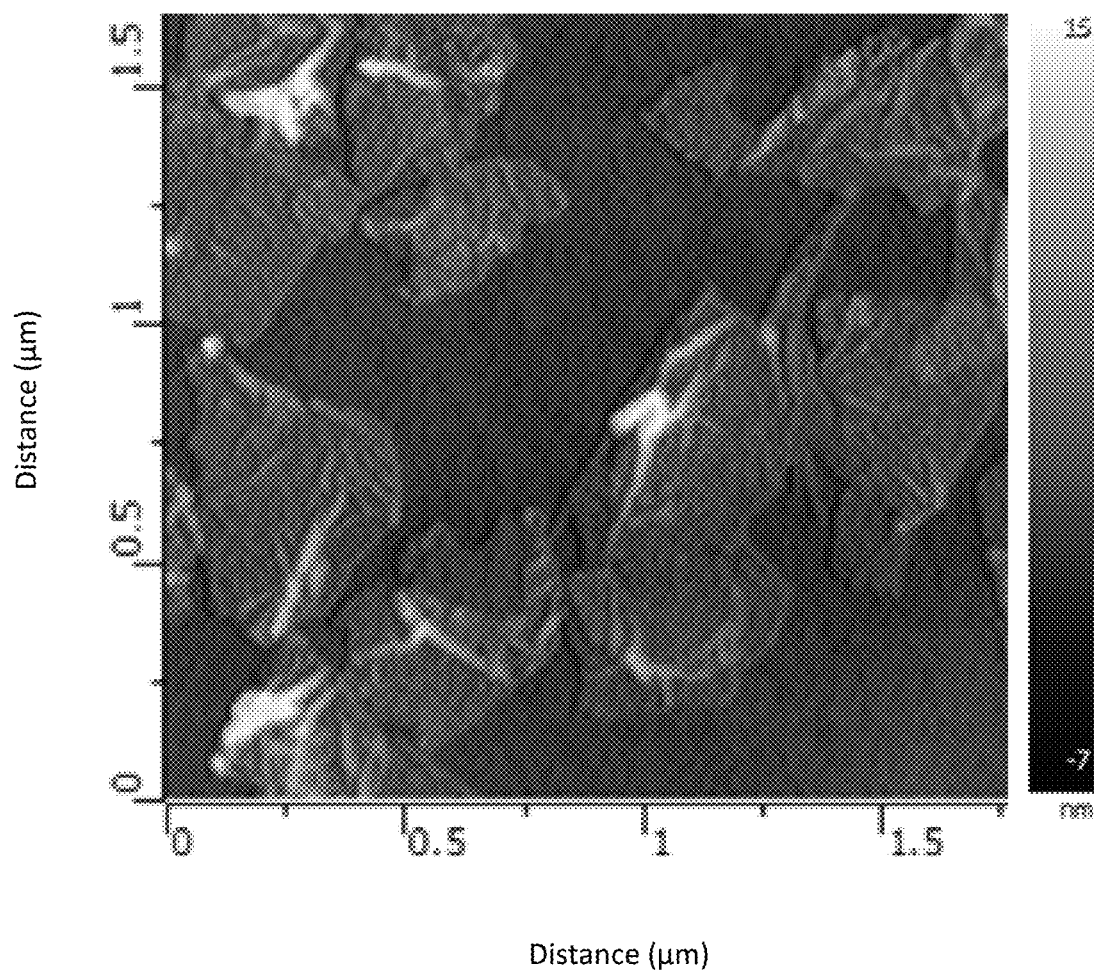
FIG. 6 shows an AFM image an exemplary first ARGO, per one or more embodiments herein.
Figure 7:
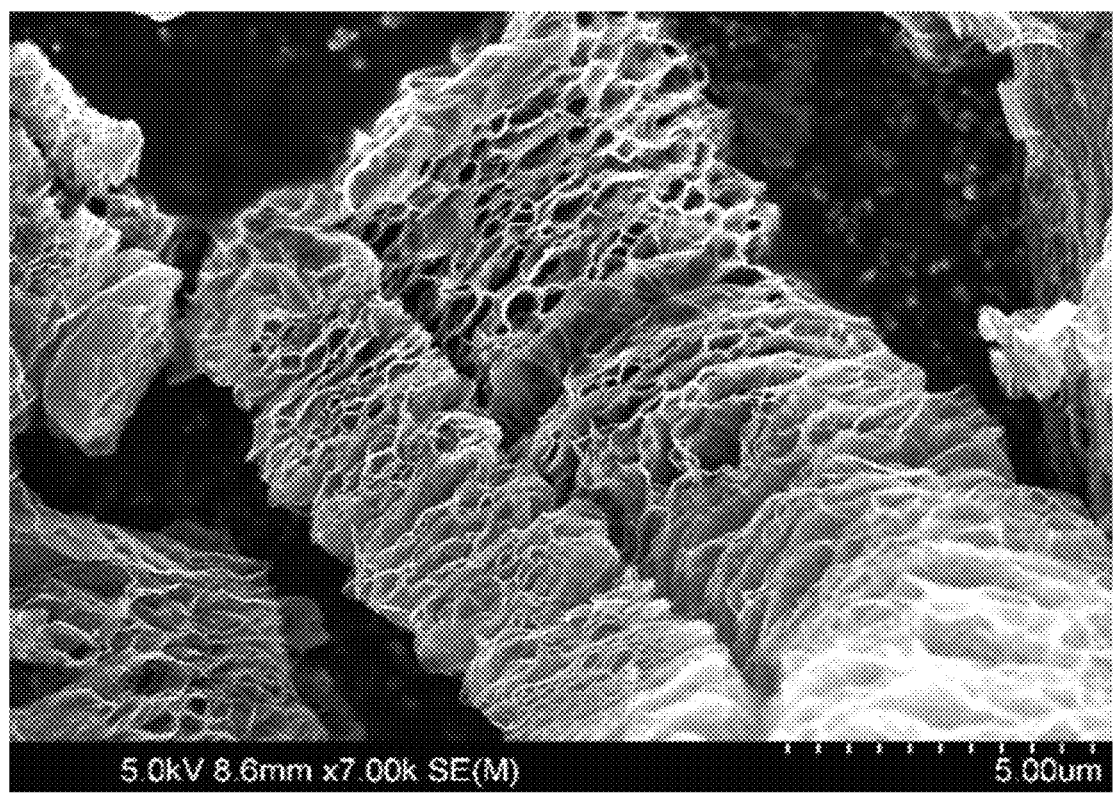
FIG. 7 shows a first SEM image of an exemplary first ARGO, per one or more embodiments herein.
Figure 8:
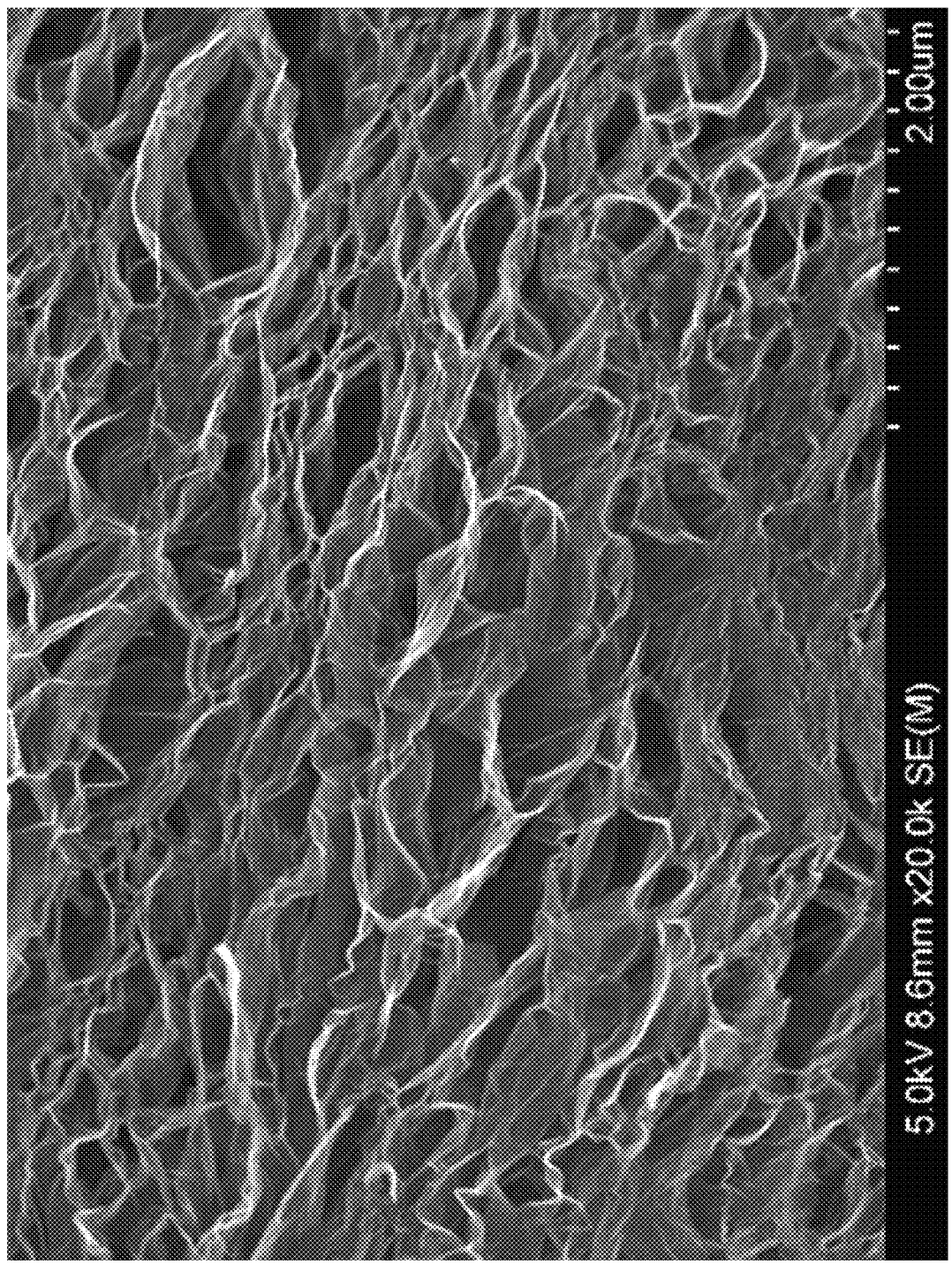
FIG. 8 shows a second SEM image of an exemplary first ARGO, per one or more embodiments herein.
Figure 9:
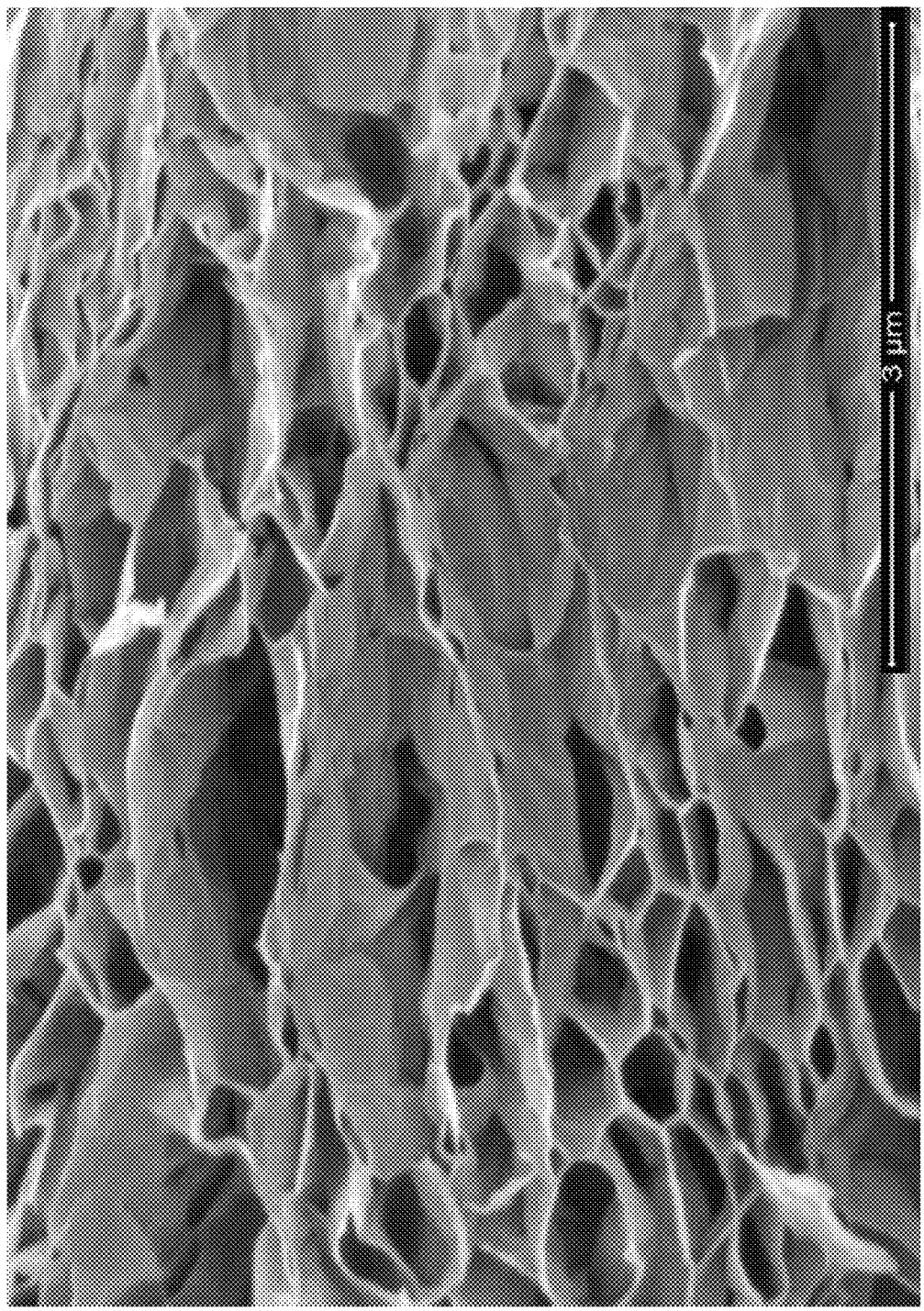
FIG. 9 shows a third SEM image of an exemplary first ARGO, per one or more embodiments herein.
Figure 10:
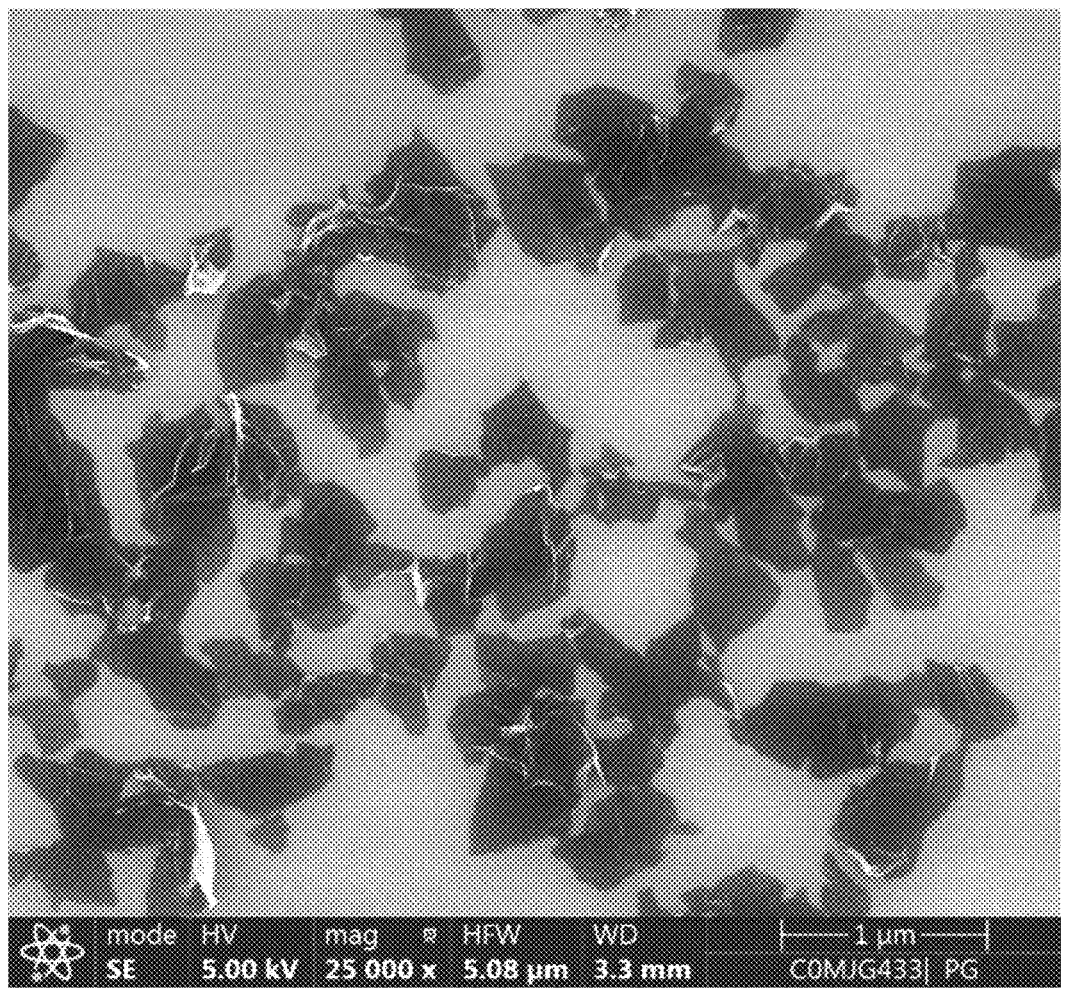
FIG. 10 shows a fourth SEM image of an exemplary first ARGO, per one or more embodiments herein.

FIG. 5A shows an AFM image an exemplary first ARGO, displaying a uniform thickness of about 1.5 nm. FIG. 5B shows a particle size distribution graph of the exemplary first ARGO of FIG. 5A. As shown in FIG. 5A, the first ARGO particles have a dendritic morphology having a large perimeter length. Further, as shown, the first ARGO particles have an average height of about 1.6 nm, wherein two stacked first ARGO particles have an average height of about 4 nm. Further, per FIG. 5B, in some embodiments, the first ARGO particles have a size ranging from about 0.1 μm to about 1 μm, with a median of about 0.5 μm. In some embodiments, the first ARGO has a particle size of at least about 0.1 μm, 0.25 μm, 0.5 μm, 0.75 μm, 1 μm, 1.25 μm, 1.5 μm, 2 μm, 2.5 μm, or about 3 μm including increments therein. In some embodiments, the first ARGO has a particle size of at most about 0.25 μm, 0.5 μm, 0.75 μm, 1 μm, 1.25 μm, 1.5 μm, 2 μm, 2.5 μm, 3 μm, or 3.5 μm, including increments therein. In some embodiments, the particle size of the first ARGO is measured as a mean particle size or a median particle size. In some embodiments, the particle size of the AGO is measured as a length, a width, or a diagonal length of the first ARGO particles.

FIGS. 7-10 show SEM images of an exemplary first ARGO. As shown therein, the exemplary first ARGO comprises a plurality of layers forming interlayer pores therebetween. In some embodiments, as shown therein, the interlayer pores form a continuous network. In some embodiments, as shown therein, one or more of the interlayer pores are closed. In some embodiments, as shown therein, one or more of the interlayer pores are defined by 2, 3, 4, 5, 6, 7, 8, 9, 10, or more layers. In some embodiments, as shown therein, the layers are interconnected. In some embodiments, as shown therein, one or more of the layers are corrugated. In some embodiments, as shown therein, one or more of the layers have a wrinkle. In some embodiments, as shown therein, one or more of the layers have a crease. In some embodiments, as shown therein, the plurality of layers form an accordion-like structure. In some embodiments, as shown therein, the plurality of layers form an foam-like structure. In some embodiments, as shown therein, the plurality of layers in the first ARGO are generally parallel. In some embodiments, as shown therein, the layers are not stacked. The large size of the interlayer spaces shown therein enable the high surface area and ion diffusion rate of the exemplary first ARGO.

Figure 11:
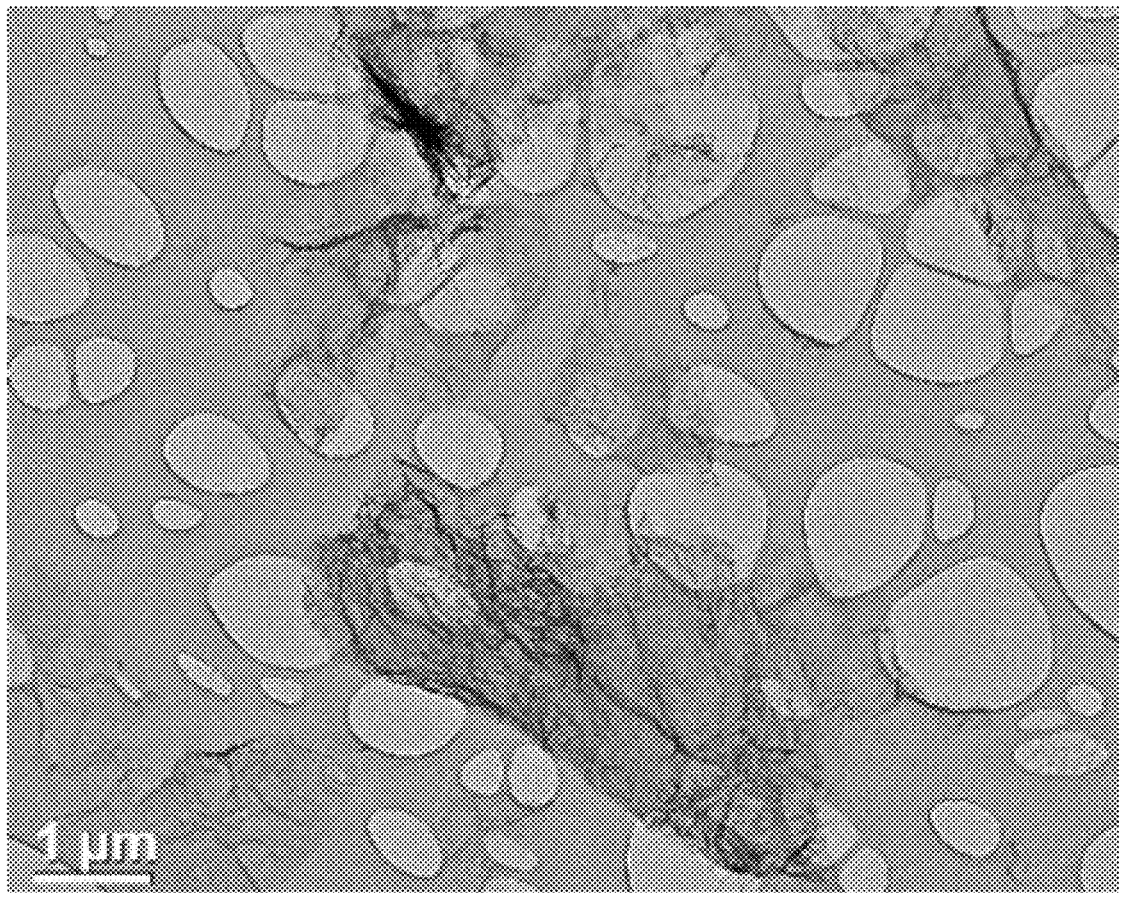
FIG. 11 shows a TEM image of an exemplary first ARGO, per one or more embodiments herein.

FIG. 11 shows a TEM image displaying the fully exfoliated exemplary first ARGO, wherein the layers therein are separated and not restacked. The in-plane nanopores shown therein demonstrate the successful activation of the exemplary first ARGO. Further, the ridges, creases, and wrinkles shown therein, which may be introduced from rapid thermal expansion, mitigate the restacking of graphene layers.

FIGS. 12A-C show AFM images an exemplary second ARGO. As seen therein the exemplary first ARGO has particle having a width of about 0.25 μm to about 2.5 μm, wherein the width is measured as an average width, a maximum width, a minimum width, or any combination thereof. Further as shown, the exemplary second ARGO particles are made of flakes having a single wrinkled layer, which greatly increases its high surface area and minimizes restacking. As shown therein the exemplary second ARGO has a maximum, minimum, or average height of about 15 nm. In some embodiments, the first ARGO, the second ARGO, or both has a height of about 10 nm to about 25 nm. In some embodiments, the first ARGO, the second ARGO, or both has a height of at least about 10 nm, 15 nm, 20 nm, or more, including increments therein. In some embodiments, the first ARGO, the second ARGO, or both has a height of at most about 25 nm. In some embodiments, the height of the first ARGO, the second ARGO, or both greatly increases its high surface area and minimizes restacking.

Figure 13A:
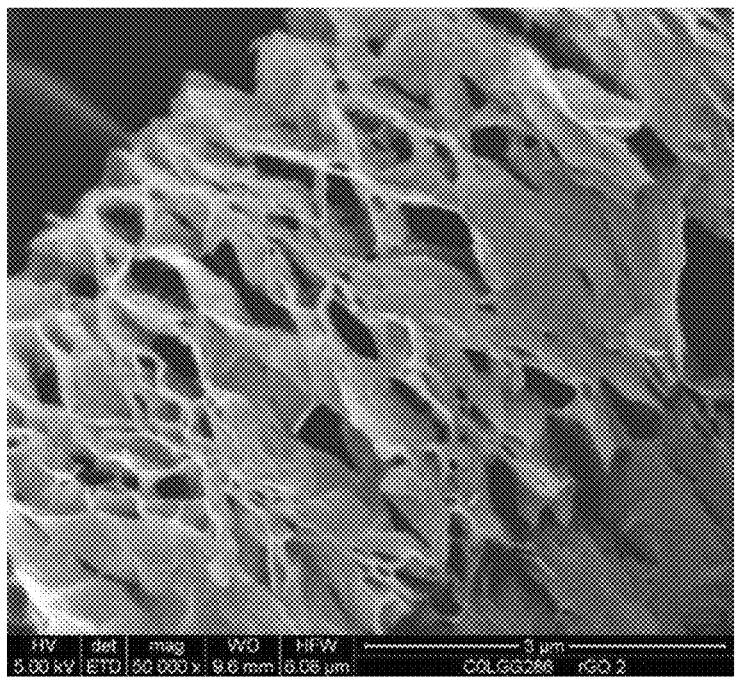
FIG. 13A shows a first SEM image of an exemplary second ARGO, per one or more embodiments herein.
Figure 13B:
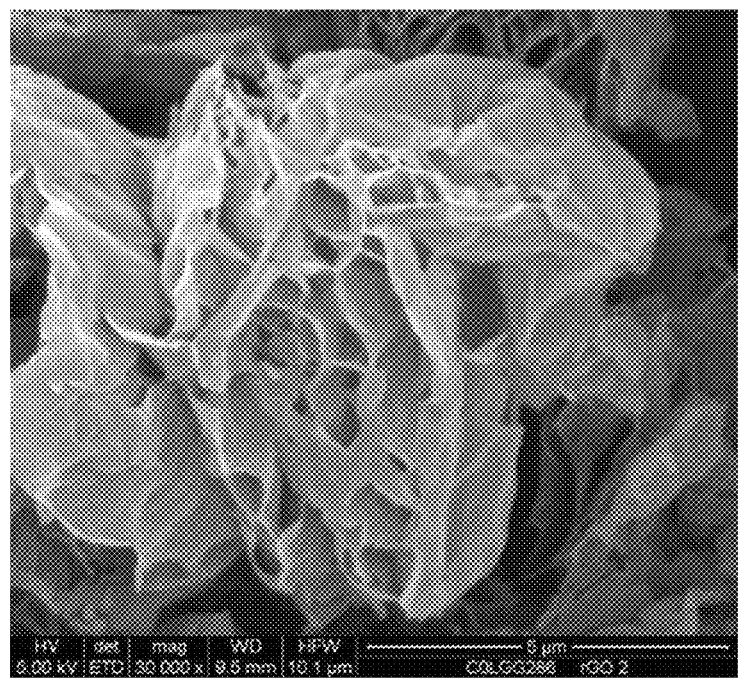
FIG. 13B shows a second SEM image of an exemplary second ARGO, per one or more embodiments herein.

FIGS. 13A and 13B show SEM images of an exemplary second ARGO that exhibits a foam-like structure of individual graphene nanosheets that are fully expanded apart. As shown therein, the exemplary first ARGO comprises a plurality of layers forming interlayer spaces therebetween. In some embodiments, the layers are not stacked. The large size of the interlayer spaces shown therein enable the high surface area and ion diffusion rate of the exemplary first ARGO. Because of its unique structure, the second ARGO demonstrates a remarkably high surface area and electronic conductivity. As shown therein, the exemplary second ARGO comprises a plurality of layers forming interlayer pores therebetween. In some embodiments, as shown therein, the interlayer pores form a continuous network. In some embodiments, as shown therein, one or more of the interlayer pores are closed. In some embodiments, as shown therein, one or more of the interlayer pores are defined by 2, 3, 4, 5, 6, 7, 8, 9, 10, or more layers. In some embodiments, as shown therein, the layers are interconnected. In some embodiments, as shown therein, one or more of the layers are corrugated. In some embodiments, as shown therein, one or more of the layers are wrinkled. In some embodiments, as shown therein, the plurality of layers form an accordion-like structure. In some embodiments, as shown therein, the plurality of layers form an foam-like structure. In some embodiments, as shown therein, the plurality of layers in the second ARGO are generally parallel. In some embodiments, as shown therein, the layers are not stacked. The large size of the interlayer spaces shown therein enable the high surface area and ion diffusion rate of the exemplary second ARGO.

Figure 14:
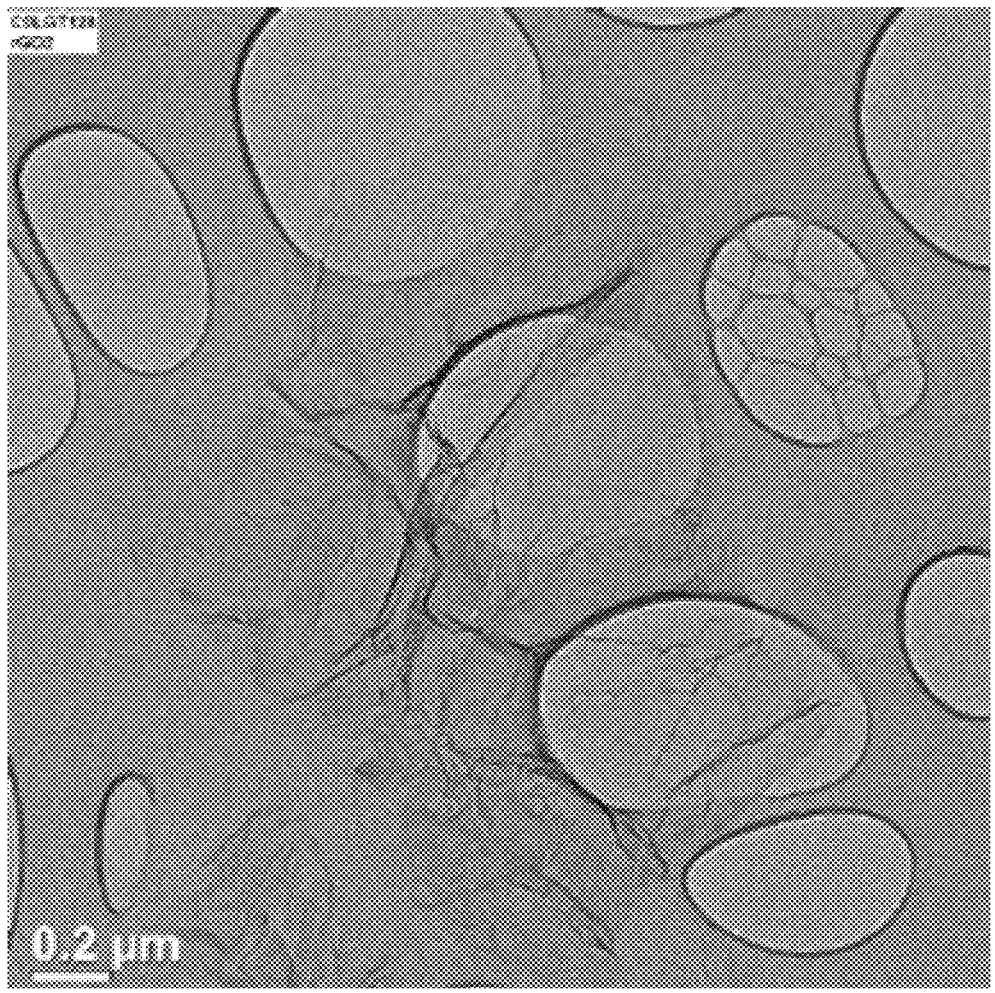
FIG. 14 shows a TEM image of an exemplary second ARGO, per one or more embodiments herein.

FIG. 14 shows a TEM image showing the individualized graphene nanosheets of an exemplary second ARGO. As seen therein, the large wrinkles and ridges in the basal planes of the graphene nanosheets prevents the collapse and restacking of graphene sheets from van der Waals interactions. Further, the portions therein that are transparent to the electron beam provide further support that the graphene sheets are well-separated and single-layered.

While graphene may be difficult to disperse in a solvent medium, the oxygen-containing functionalities of the ARGO herein enables its dispersion in a polar solvent. In some embodiments, the ARGO herein is dispersed in an organic or aqueous solvent (e.g. NMP, DMF, THF, chloroform and dichlorobenzene) by adding a surfactant and applying a mechanical force by, for example, as shear mixing, ultrasonic agitation, ball milling, or any combination thereof. In some embodiments, dispersions comprising the ARGO herein comprise concentrations up to about 0.5 mg/mL.

Figure 26A:
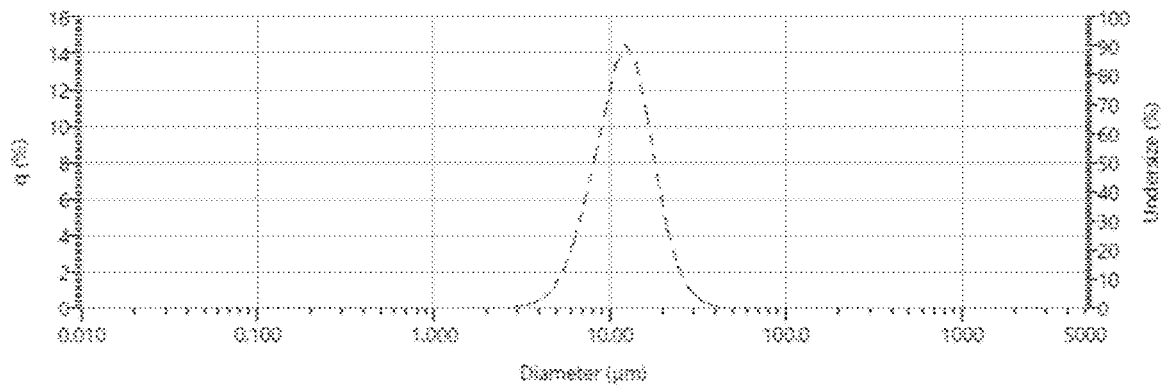
FIG. 26A shows a logarithmic particle size distribution graph of an exemplary second ARGO, per one or more embodiments herein.
Figure 26B:
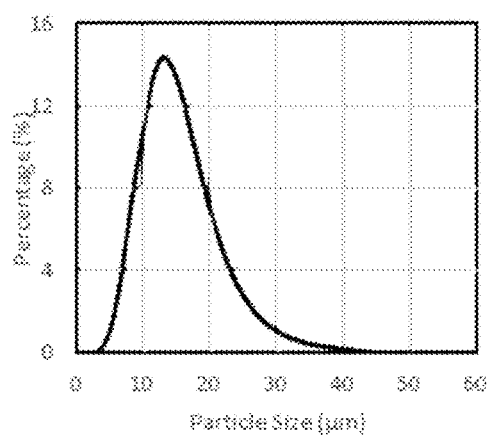
FIG. 26B shows a particle size distribution graph of an exemplary second ARGO, per one or more embodiments herein.
Figure 26C:
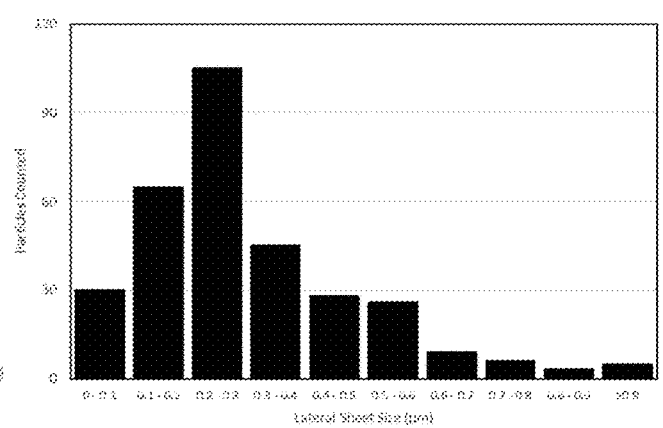
FIG. 26C shows a particle size distribution chart of an exemplary second ARGO, per one or more embodiments herein.

FIGS. 26A-C show the particle size distribution of an exemplary second ARGO. As shown therein, the exemplary second ARGO has a size ranging from about 2 μm to about 90 μm, with a median of about 12 μm to about 15 μm.

Characterization of Activated Reduced Graphene Oxide

Figure 19A:
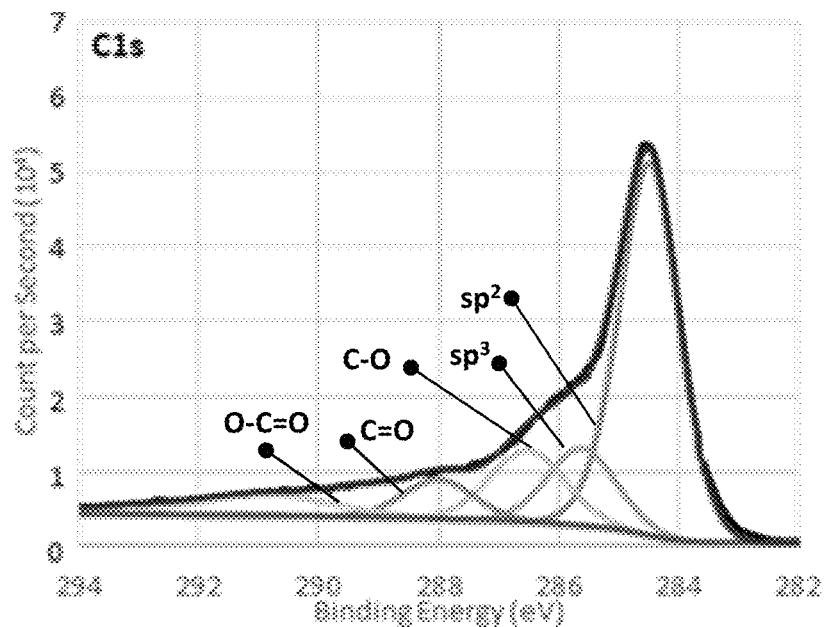
FIG. 19A shows an Cl spectrum graph of an exemplary first ARGO, per one or more embodiments herein.

FIG. 19A shows an C1 spectrum graph of an exemplary Activated Graphene Oxide (AGO), which can be deconvoluted into five peaks, each with a peak energy and a relative intensity. As shown, the five energy peaks for $sp^2$, $sp^3$, C—O, C=O, and O—C=O bonds are 284.5 eV, 285.6 eV, 286.5 eV, 288.0 eV, and 290.9 eV, respectively. Further, as shown the relative intensities, which correlate to the contribution of each functional group, for the $sp^2$, $sp^3$, C—O, C=O, and O—C=O bonds are 56.4%, 12.8%, 13.4%, 6.6%, and 7.3%, respectively.

Figure 19B:
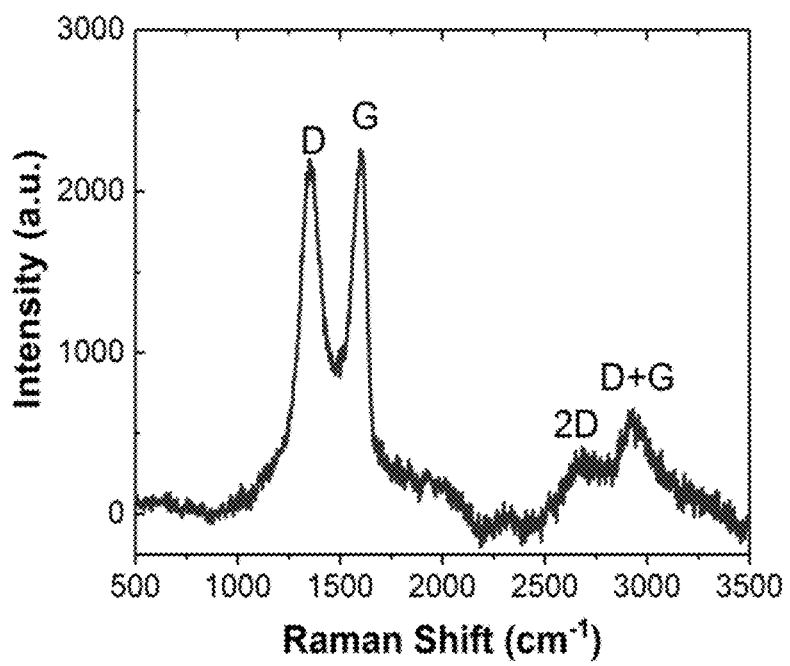
FIG. 19B shows a Raman spectroscopy graph of an exemplary first ARGO, per one or more embodiments herein.

FIG. 19B shows a Raman spectroscopy graph of an exemplary first ARGO wherein a "D" band at about 1350 $cm^{-2}$, a "G" band at about 1580 $cm^{-2}$, a "2D" band at about 2690 $cm^{-2}$ and a "D+G" band at about 2900 $cm^{-2}$ verifies the recovery of $sp^2$ conjugation after reduction. The D and G peaks correspond to $sp^3$ and $sp^2$ hybridized carbons, respectively, wherein a ratio between the intensities of the D and G peaks corresponds to a defect density of the first ARGO. In this example, the D:G ratio is about 1:1.2 displaying a defect density of about 0.8.

In some embodiments, such defects act as electron transfer sites and enable lithium ions to flow therethrough. As such, the defect density of the first ARGO enables the formation of electrodes and energy storage devices with improved charge/discharge kinetics, charge cycling capabilities, and electro-activity. In some embodiments, defect density is inversely proportional to crystallinity and electron mobility of the first ARGO.

In some embodiments, the first ARGO has a D:G ratio of about 0.1:1 to about 1:5. In some embodiments, the first ARGO has a D:G ratio of at least about 0.1:1, 0.3:1, 0.5:1, 0.8:1, 1:1, 1:1.2, 1:1.5, 1:1.8, 1:2, 1:3, 1:4, or about 1:5. In some embodiments, the first ARGO has a D:G ratio of no more than about 0.1:1, 0.3:1, 0.5:1, 0.8:1, 1:1, 1:1.2, 1:1.5, 1:1.8, 1:2, 1:3, 1:4, or about 1:5.

In some embodiments, the first ARGO has a defect density of about 0.1 to about 1.5. In some embodiments, the first ARGO has a defect density of about 0.1 to about 0.2, about 0.1 to about 0.3, about 0.1 to about 0.4, about 0.1 to about 0.5, about 0.1 to about 0.6, about 0.1 to about 0.7, about 0.1 to about 0.8, about 0.1 to about 0.9, about 0.1 to about 1, about 0.1 to about 1.2, about 0.1 to about 1.5, about 0.2 to about 0.3, about 0.2 to about 0.4, about 0.2 to about 0.5, about 0.2 to about 0.6, about 0.2 to about 0.7, about 0.2 to about 0.8, about 0.2 to about 0.9, about 0.2 to about 1, about 0.2 to about 1.2, about 0.2 to about 1.5, about 0.3 to about 0.4, about 0.3 to about 0.5, about 0.3 to about 0.6, about 0.3 to about 0.7, about 0.3 to about 0.8, about 0.3 to about 0.9, about 0.3 to about 1, about 0.3 to about 1.2, about 0.3 to about 1.5, about 0.4 to about 0.5, about 0.4 to about 0.6, about 0.4 to about 0.7, about 0.4 to about 0.8, about 0.4 to about 0.9, about 0.4 to about 1, about 0.4 to about 1.2, about 0.4 to about 1.5, about 0.5 to about 0.6, about 0.5 to about 0.7, about 0.5 to about 0.8, about 0.5 to about 0.9, about 0.5 to about 1, about 0.5 to about 1.2, about 0.5 to about 1.5, about 0.6 to about 0.7, about 0.6 to about 0.8, about 0.6 to about 0.9, about 0.6 to about 1, about 0.6 to about 1.2, about 0.6 to about 1.5, about 0.7 to about 0.8, about 0.7 to about 0.9, about 0.7 to about 1, about 0.7 to about 1.2, about 0.7 to about 1.5, about 0.8 to about 0.9, about 0.8 to about 1, about 0.8 to about 1.2, about 0.8 to about 1.5, about 0.9 to about 1, about 0.9 to about 1.2, about 0.9 to about 1.5, about 1 to about 1.2, about 1 to about 1.5, or about 1.2 to about 1.5, including increments therein. In some embodiments, the first ARGO has a defect density of about 0.1, about 0.2, about 0.3, about 0.4, about 0.5, about 0.6, about 0.7, about 0.8, about 0.9, about 1, about 1.2, or about 1.5. In some embodiments, the first ARGO has a defect density of at least about 0.1, about 0.2, about 0.3, about 0.4, about 0.5, about 0.6, about 0.7, about 0.8, about 0.9, about 1, or about 1.2. In some embodiments, the first ARGO has a defect density of at most about 0.2, about 0.3, about 0.4, about 0.5, about 0.6, about 0.7, about 0.8, about 0.9, about 1, about 1.2, or about 1.5.

Figure 20A:
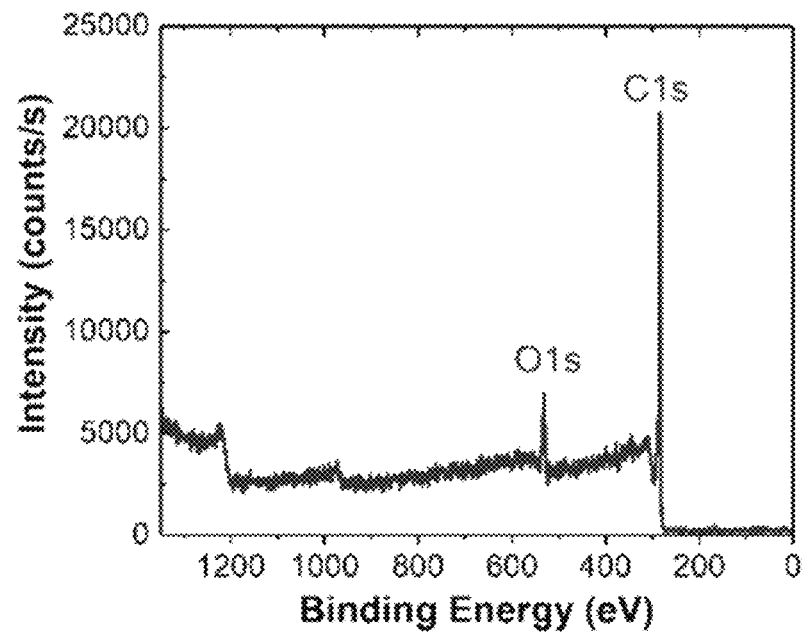
FIG. 20A shows an XPS graph of an exemplary first ARGO, per one or more embodiments herein.

FIG. 20A shows an XPS graph, which confirms the low oxygen content and high purity of the exemplary first ARGO. FIGS. 19A and 20A, show that the exemplary first ARGO has a low impurity content of about 0.3%, a dominating carbon element of about 90%, a C/O atomic ratio of about 8.5, a large content of $sp^2$ carbon, and a small quantity of oxygen-containing functional groups.

Figure 20B:
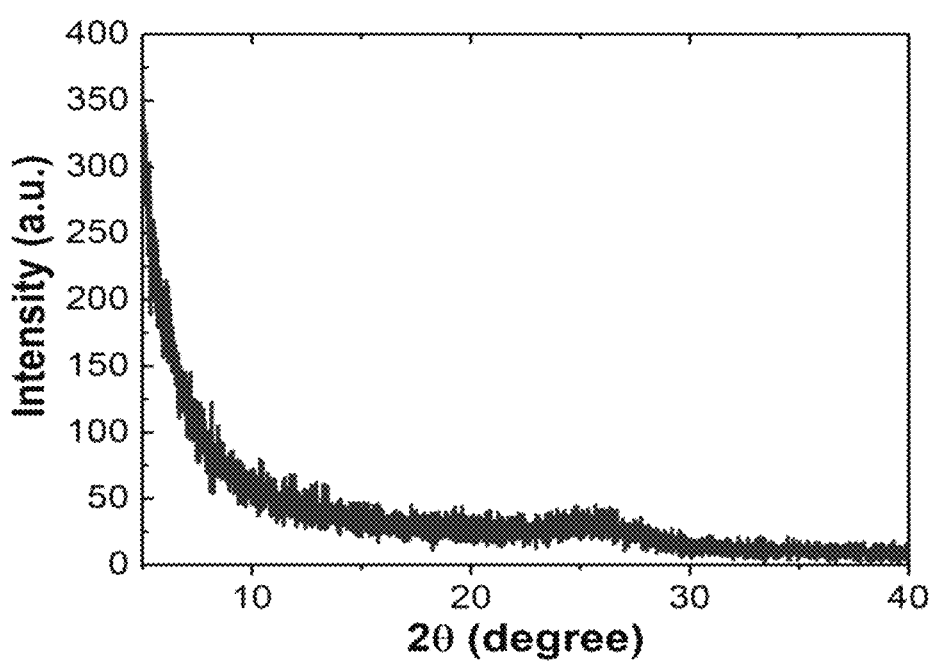
FIG. 20B shows a XRD graph of an exemplary first ARGO, per one or more embodiments herein.
Figure 21:
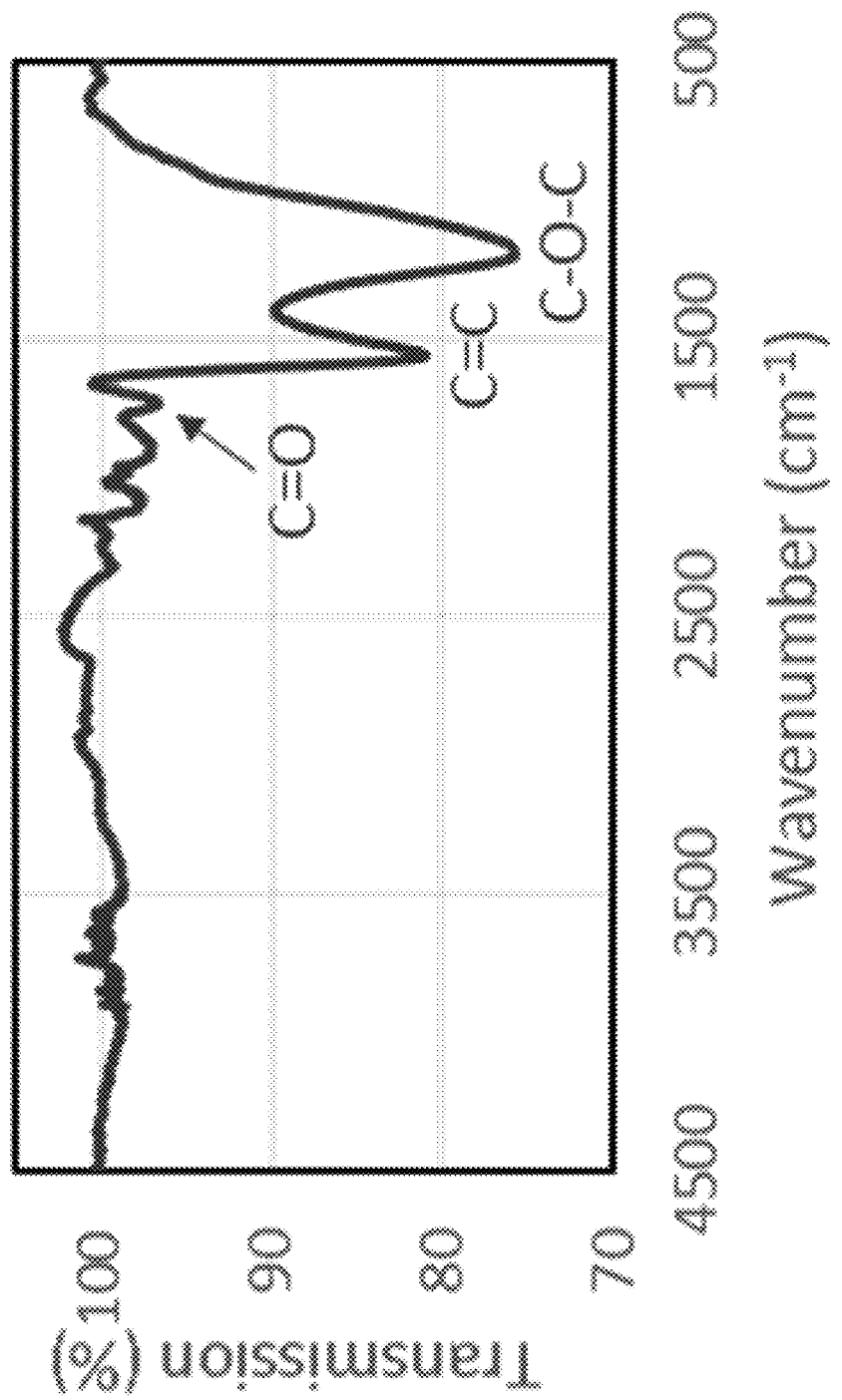
FIG. 21 shows a FTIR graph of an exemplary first ARGO, per one or more embodiments herein.

The XRD graph, per FIG. 20B, appears almost featureless except for a weak and broad hump from about 20° to about 30°, confirming the exfoliated monolayer nature of the exemplary first ARGO. FIG. 21 shows a FTIR graph of an exemplary first ARGO with an absence of O-H stretching at about 3400 $cm^{-2}$, reduced C=O stretching at about 1740 $cm^{-2}$, dominance of C=C stretching at about 1570 $cm^{-2}$, and C—O—C stretching at about 1200 $cm^{-2}$. In some embodiments, the ARGO may be free from all or substantially all OH functional groups.

Figure 22A:
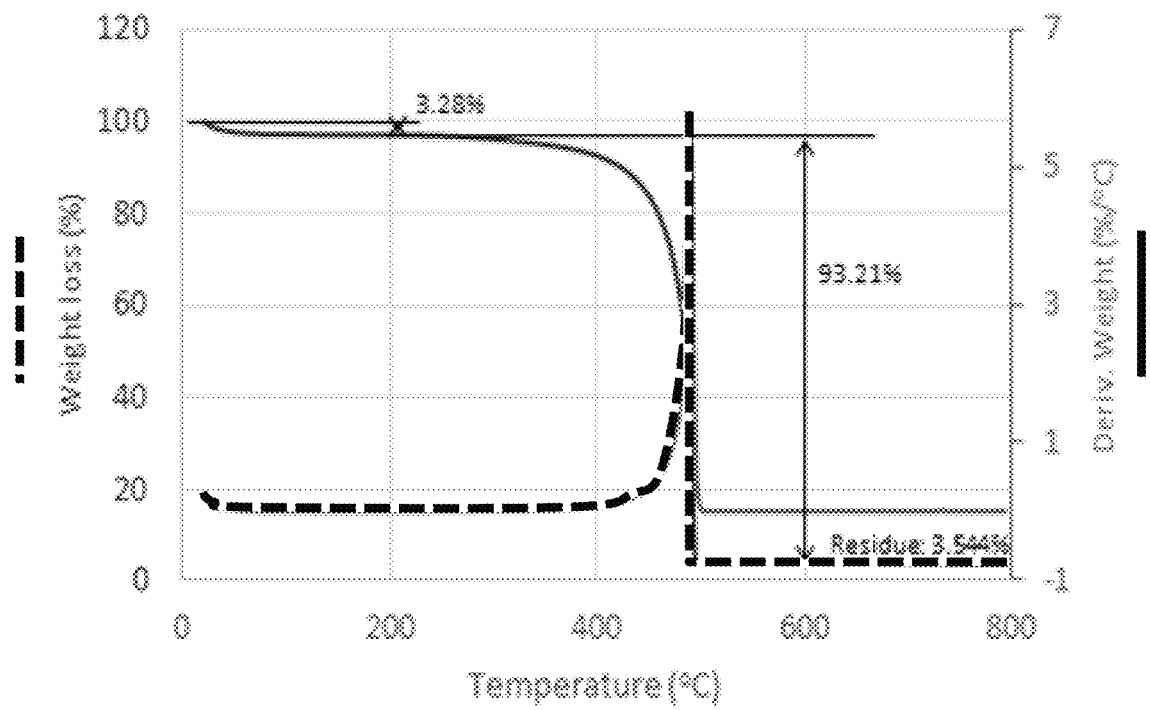
FIG. 22A shows a thermal analysis of an exemplary first ARGO, per one or more embodiments herein.
Figure 22B:
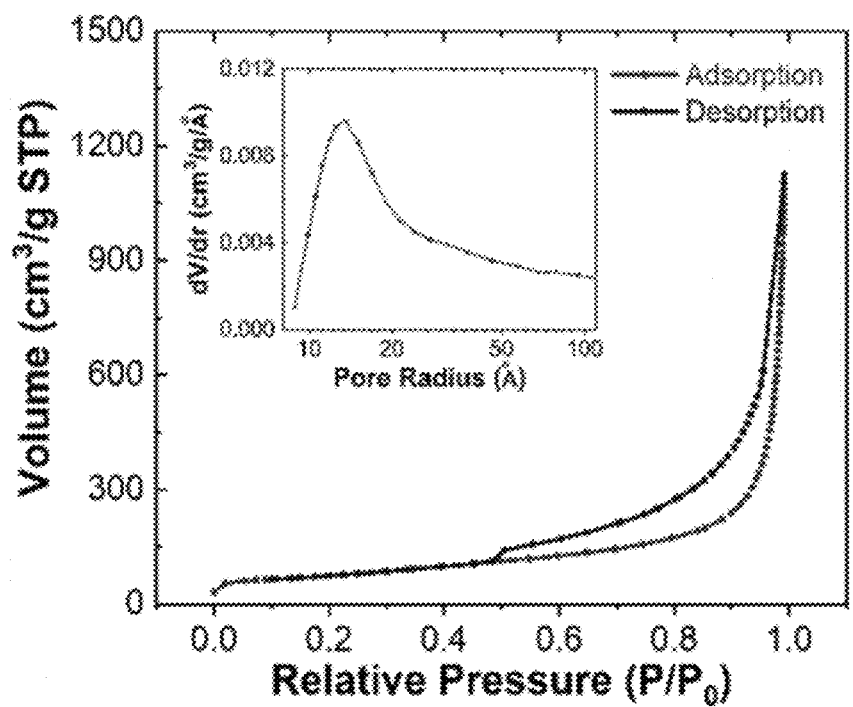
FIG. 22B shows an isothermal analysis and a pore size distribution of an exemplary first ARGO, per one or more embodiments herein.

FIG. 22A shows a thermal analysis showing that the exemplary first ARGO is stable against heating in air at temperatures of up to about 400° C., and undergoes complete combustion at about 500° C. FIG. 22B shows an isothermal analysis displaying a type IV isotherm with an H3 type hysteresis loop, which confirms the micro-mesoporous structure of the exemplary first ARGO of nanoplatelets with a slit-like morphology. Further, as shown a pore size distribution chart, obtained using BJH adsorption, shows a prominent micropore distribution centered at about 1.3 nm.

Figure 23A:
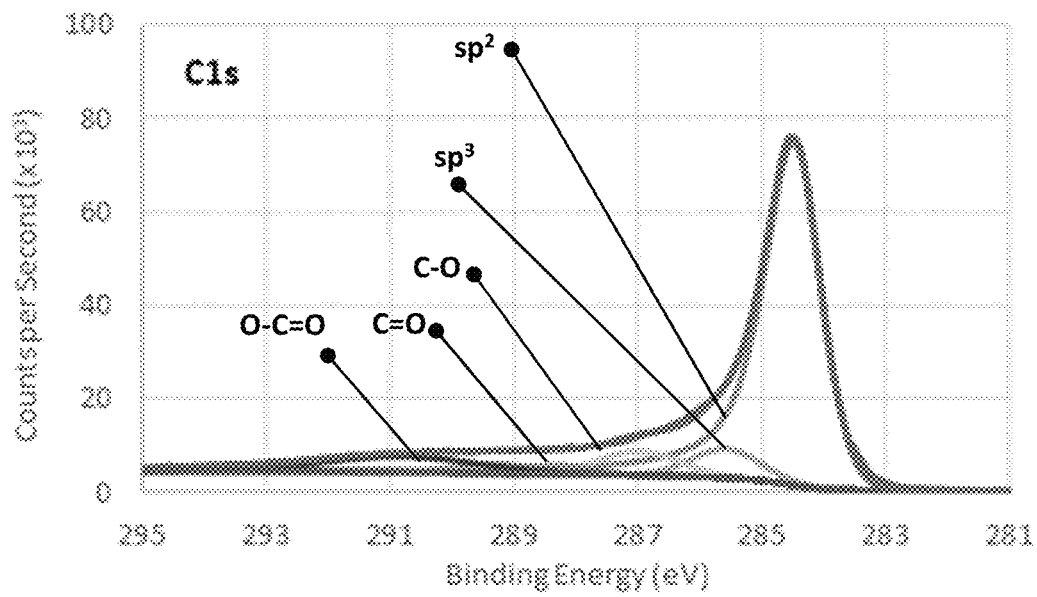
FIG. 23A shows an Cl spectrum graph of an exemplary second ARGO, per one or more embodiments herein.

FIG. 23A shows an C1 spectrum graph of an exemplary second ARGO, which can be deconvoluted into five peaks, each with a peak energy and a relative intensity. As shown, the five energy peaks for $sp^2$, $sp^3$, C—O, C=O, and O—C=O bonds are 284.5 eV, 285.6 eV, 287. eV, 288.0 eV, and 290.9 eV, respectively. Further, as shown the relative intensities, which correlate to the contribution of each functional group, for the $sp^2$, $sp^3$, C—O, C=O, and O—C=O bonds are 68.8%, 7.4%, 7.2%, 2.3%, and 9.4%, respectively.

Figure 23B:
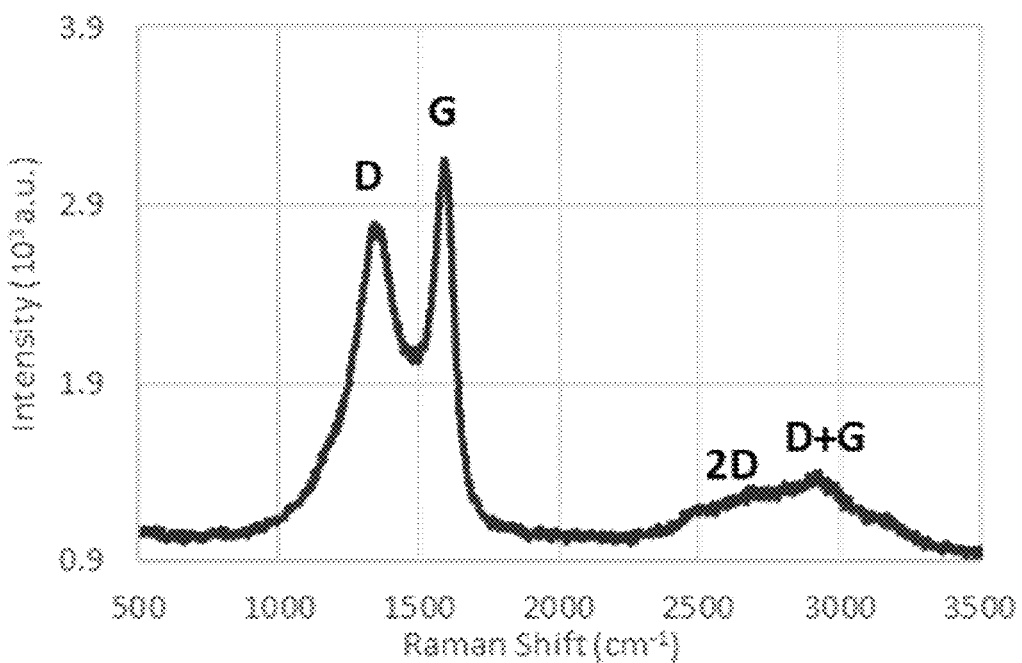
FIG. 23B shows a Raman spectroscopy graph of an exemplary second ARGO, per one or more embodiments herein.
Figure 24A:
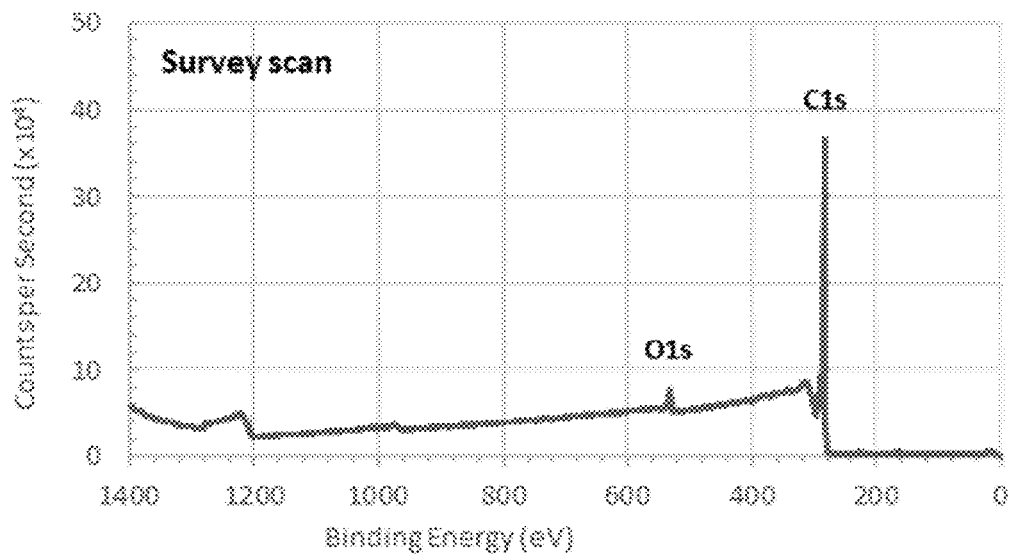
FIG. 24A shows a first XPS graph of an exemplary second ARGO, per one or more embodiments herein.

The C1 spectrum graph of FIG. 23A and the XRD graph of FIG. 24A confirm the successful removal of the oxygen-containing functionalities from an exemplary second ARGO during reduction. FIG. 23B shows a Raman spectroscopy graph of an exemplary second ARGO. FIG. 24A shows an XPS graph of an exemplary second ARGO featuring a "D" band at about 1350 $cm^{-2}$, a "G" band at about 1580 $cm^{-2}$, a "2D" band at about 2690 $cm^{-2}$, and a "D+G" band at about 2900 $cm^{-2}$, which verify the recovery of $sp^2$ conjugation after reduction. The D and G peaks correspond to $sp^3$ and $sp^2$ hybridized carbons, respectively, wherein a ratio between the intensities of the D and G peaks corresponds to a defect density of the second ARGO. In this example, the D:G ratio is about 1:1.2 displaying a defect density of about 0.8.

In some embodiments, such defects act as electron transfer sites and enable lithium ions to flow therethrough. As such, the defect density of the second ARGO enables the formation of electrodes and energy storage devices with improved charge/discharge kinetics, charge cycling capabilities, and electro-activity. In some embodiments, defect density is inversely proportional to crystallinity and electron mobility of the second ARGO.

In some embodiments, the second ARGO has a D:G ratio of about 0.1:1 to about 1:5. In some embodiments, the second ARGO has a D:G ratio of at least about 0.1:1, 0.3:1, 0.5:1, 0.8:1, 1:1, 1:1.2, 1:1.5, 1:1.8, 1:2, 1:3, 1:4, or about 1:5. In some embodiments, the second ARGO has a D:G ratio of no more than about 0.1:1, 0.3:1, 0.5:1, 0.8:1, 1:1, 1:1.2, 1:1.5, 1:1.8, 1:2, 1:3, 1:4, or about 1:5.

In some embodiments, the second ARGO has a defect density of about 0.1 to about 1.5. In some embodiments, the second ARGO has a defect density of about 0.1 to about 0.2, about 0.1 to about 0.3, about 0.1 to about 0.4, about 0.1 to about 0.5, about 0.1 to about 0.6, about 0.1 to about 0.7, about 0.1 to about 0.8, about 0.1 to about 0.9, about 0.1 to about 1, about 0.1 to about 1.2, about 0.1 to about 1.5, about 0.2 to about 0.3, about 0.2 to about 0.4, about 0.2 to about 0.5, about 0.2 to about 0.6, about 0.2 to about 0.7, about 0.2 to about 0.8, about 0.2 to about 0.9, about 0.2 to about 1, about 0.2 to about 1.2, about 0.2 to about 1.5, about 0.3 to about 0.4, about 0.3 to about 0.5, about 0.3 to about 0.6, about 0.3 to about 0.7, about 0.3 to about 0.8, about 0.3 to about 0.9, about 0.3 to about 1, about 0.3 to about 1.2, about 0.3 to about 1.5, about 0.4 to about 0.5, about 0.4 to about 0.6, about 0.4 to about 0.7, about 0.4 to about 0.8, about 0.4 to about 0.9, about 0.4 to about 1, about 0.4 to about 1.2, about 0.4 to about 1.5, about 0.5 to about 0.6, about 0.5 to about 0.7, about 0.5 to about 0.8, about 0.5 to about 0.9, about 0.5 to about 1, about 0.5 to about 1.2, about 0.5 to about 1.5, about 0.6 to about 0.7, about 0.6 to about 0.8, about 0.6 to about 0.9, about 0.6 to about 1, about 0.6 to about 1.2, about 0.6 to about 1.5, about 0.7 to about 0.8, about 0.7 to about 0.9, about 0.7 to about 1, about 0.7 to about 1.2, about 0.7 to about 1.5, about 0.8 to about 0.9, about 0.8 to about 1, about 0.8 to about 1.2, about 0.8 to about 1.5, about 0.9 to about 1, about 0.9 to about 1.2, about 0.9 to about 1.5, about 1 to about 1.2, about 1 to about 1.5, or about 1.2 to about 1.5, including increments therein. In some embodiments, the second ARGO has a defect density of about 0.1, about 0.2, about 0.3, about 0.4, about 0.5, about 0.6, about 0.7, about 0.8, about 0.9, about 1, about 1.2, or about 1.5. In some embodiments, the second ARGO has a defect density of at least about 0.1, about 0.2, about 0.3, about 0.4, about 0.5, about 0.6, about 0.7, about 0.8, about 0.9, about 1, or about 1.2. In some embodiments, the second ARGO has a defect density of at most about 0.2, about 0.3, about 0.4, about 0.5, about 0.6, about 0.7, about 0.8, about 0.9, about 1, about 1.2, or about 1.5.

Figure 24B:
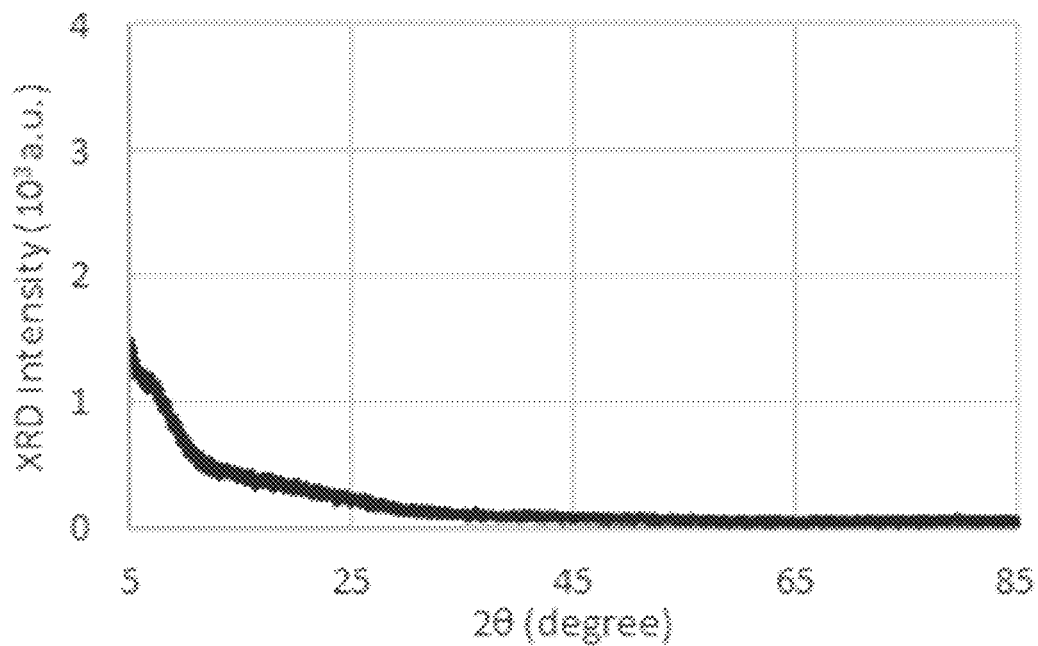
FIG. 24B shows a second XRD graph of an exemplary second ARGO, per one or more embodiments herein.
Figure 25:
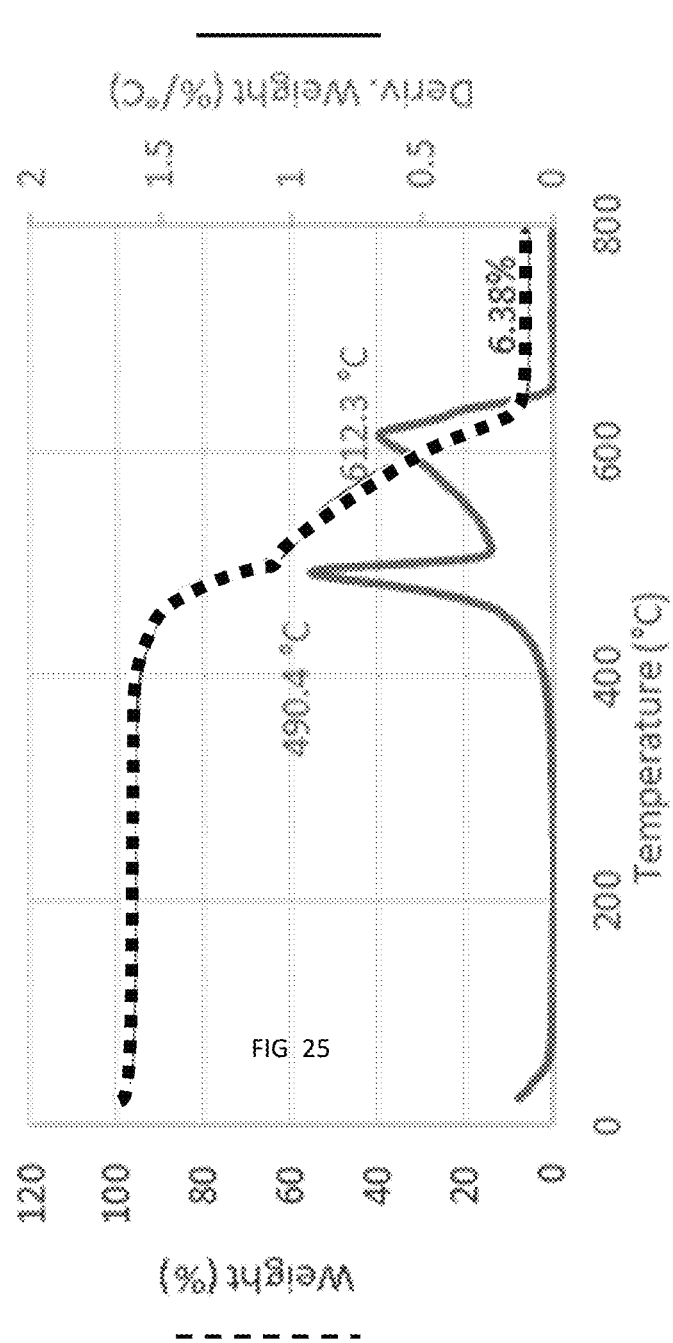
FIG. 25 shows a thermal analysis of an exemplary second ARGO, per one or more embodiments herein.

The thermal analysis, per FIG. 25, shows that the exemplary second ARGO is stable against heat in air at temperatures of about 500° C. and combusts about 610° C. The XRD graph, per FIG. 24B, is featureless across the spectrum range of about 5° to about 90°, showing that the exemplary second ARGO comprises an exfoliated monolayer structure.

Properties of exemplary first ARGO and second ARGO samples are shown in Table 3 below. In some embodiments, the first ARGO, the second ARGO, or both have an average lateral dimension of about 0.2 μm to about 0.9 μm. In some embodiments, the first ARGO, the second ARGO, or both have an average lateral dimension of at least about 0.2 μm, 0.3 μm, 0.4 μm, 0.5 μm, 0.6 μm, 0.7 μm, 0.8 μm, or more, including increments therein. In some embodiments, the first ARGO, the second ARGO, or both have an average lateral dimension of at most about 0.3 μm, 0.4 μm, 0.5 μm, 0.6 μm, 0.7 μm, 0.8 μm, 0.9 μm, or more, including increments therein. In some embodiments, the first ARGO, second ARGO, or both, have a surface area of about 650 $m^2$/g to about 1,500 $m^2$/g. In some embodiments, the first ARGO, second ARGO, or both, have a surface area of at least about 650 $m^2$/g, 700 $m^2$/g, 750 $m^2$/g, 800 $m^2$/g, 850 $m^2$/g, 900 $m^2$/g, 1,000 $m^2$/g, 1,100 $m^2$/g, 1,200 $m^2$/g, 1,300 $m^2$/g, 1,400 $m^2$/g, or more including increments therein. In some embodiments, the first ARGO, second ARGO, or both, have a density of about 0.001 g/$cm^3$ to about 0.05 g/$cm^3$. In some embodiments, the first ARGO, second ARGO, or both, have a carbon content by weight of about 85% to about 98%. In some embodiments, the first ARGO, second ARGO, or both, have a carbon content by weight of at least about 85%, 86%, 87%, 88%, 89%, 90%, 91%, 92%, 93%, 94%, 95%, 96%, 97%, or more, including increments therein. In some embodiments, the first ARGO, second ARGO, or both, have an oxygen content by weight of about 2% to about 15%. In some embodiments, the first ARGO, second ARGO, or both, have an ash content by weight of at most about 1%.

In some embodiments, the first ARGO, second ARGO, or both has a density of about 0.0001 g/cm$^3$ to about 0.05 g/cm$^3$. In some embodiments, the first ARGO, second ARGO, or both has a density of at most about 0.001 g/cm$^3$, 0.002 g/cm$^3$, 0.003 g/cm$^3$, 0.004 g/cm$^3$, 0.004 g/cm$^3$, 0.005 g/cm$^3$, 0.006 g/cm$^3$, 0.007 g/cm$^3$, 0.008 g/cm$^3$, 0.009 g/cm$^3$, 0.010 g/cm$^3$, 0.011 g/cm$^3$, 0.012 g/cm$^3$, 0.013 g/cm$^3$, 0.014 g/cm$^3$, 0.015 g/cm$^3$, 0.016 g/cm$^3$, 0.017 g/cm$^3$, 0.018 g/cm$^3$, 0.019 g/cm$^3$, 0.020 g/cm$^3$, 0.030 g/cm$^3$, 0.040 g/cm$^3$, or about 0.050 g/cm$^3$, including increments therein. In some embodiments, the first ARGO, second ARGO, or both has a density of at least about 0.001 g/cm$^3$, 0.002 g/cm$^3$, 0.003 g/cm$^3$, 0.004 g/cm$^3$, 0.004 g/cm$^3$, 0.005 g/cm$^3$, 0.006 g/cm$^3$, 0.007 g/cm$^3$, 0.008 g/cm$^3$, 0.009 g/cm$^3$, 0.010 g/cm$^3$, 0.011 g/cm$^3$, 0.012 g/cm$^3$, 0.013 g/cm$^3$, 0.014 g/cm$^3$, 0.015 g/cm$^3$, 0.016 g/cm$^3$, 0.017 g/cm$^3$, 0.018 g/cm$^3$, 0.019 g/cm$^3$, 0.020 g/cm$^3$, 0.030 g/cm$^3$, 0.040 g/cm$^3$, or about 0.050 g/cm$^3$, including increments therein.

In some embodiments, the first ARGO, second ARGO, or both, have an electromobility of about 1 cm$^2$/V/s to about 500 cm$^2$/V/s. In some embodiments, the first ARGO, second ARGO, or both, have an electromobility of about 1 cm$^2$/V/s to about 2 cm$^2$/V/s, about 1 cm$^2$/V/s to about 5 cm$^2$/V/s, about 1 cm$^2$/V/s to about 10 cm$^2$/V/s, about 1 cm$^2$/V/s to about 25 cm$^2$/V/s, about 1 cm$^2$/V/s to about 50 cm$^2$/V/s, about 1 cm$^2$/V/s to about 75 cm$^2$/V/s, about 1 cm$^2$/V/s to about 100 cm$^2$/V/s, about 1 cm$^2$/V/s to about 200 cm$^2$/V/s, about 1 cm$^2$/V/s to about 300 cm$^2$/V/s, about 1 cm$^2$/V/s to about 400 cm$^2$/V/s, about 1 cm$^2$/V/s to about 500 cm$^2$/V/s, about 2 cm$^2$/V/s to about 5 cm$^2$/V/s, about 2 cm$^2$/V/s to about 10 cm$^2$/V/s, about 2 cm$^2$/V/s to about 25 cm$^2$/V/s, about 2 cm$^2$/V/s to about 50 cm$^2$/V/s, about 2 cm$^2$/V/s to about 75 cm$^2$/V/s, about 2 cm$^2$/V/s to about 100 cm$^2$/V/s, about 2 cm$^2$/V/s to about 200 cm$^2$/V/s, about 2 cm$^2$/V/s to about 300 cm$^2$/V/s, about 2 cm$^2$/V/s to about 400 cm$^2$/V/s, about 2 cm$^2$/V/s to about 500 cm$^2$/V/s, about 5 cm$^2$/V/s to about 10 cm$^2$/V/s, about 5 cm$^2$/V/s to about 25 cm$^2$/V/s, about 5 cm$^2$/V/s to about 50 cm$^2$/V/s, about 5 cm$^2$/V/s to about 75 cm$^2$/V/s, about 5 cm$^2$/V/s to about 100 cm$^2$/V/s, about 5 cm$^2$/V/s to about 200 cm$^2$/V/s, about 5 cm$^2$/V/s to about 300 cm$^2$/V/s, about 5 cm$^2$/V/s to about 400 cm$^2$/V/s, about 5 cm$^2$/V/s to about 500 cm$^2$/V/s, about 10 cm$^2$/V/s to about 25 cm$^2$/V/s, about 10 cm$^2$/V/s to about 50 cm$^2$/V/s, about 10 cm$^2$/V/s to about 75 cm$^2$/V/s, about 10 cm$^2$/V/s to about 100 cm$^2$/V/s, about 10 cm$^2$/V/s to about 200 cm$^2$/V/s, about 10 cm$^2$/V/s to about 300 cm$^2$/V/s, about 10 cm$^2$/V/s to about 400 cm$^2$/V/s, about 10 cm$^2$/V/s to about 500 cm$^2$/V/s, about 25 cm$^2$/V/s to about 50 cm$^2$/V/s, about 25 cm$^2$/V/s to about 75 cm$^2$/V/s, about 25 cm$^2$/V/s to about 100 cm$^2$/V/s, about 25 cm$^2$/V/s to about 200 cm$^2$/V/s, about 25 cm$^2$/V/s to about 300 cm$^2$/V/s, about 25 cm$^2$/V/s to about 400 cm$^2$/V/s, about 25 cm$^2$/V/s to about 500 cm$^2$/V/s, about 50 cm$^2$/V/s to about 75 cm$^2$/V/s, about 50 cm$^2$/V/s to about 100 cm$^2$/V/s, about 50 cm$^2$/V/s to about 200 cm$^2$/V/s, about 50 cm$^2$/V/s to about 300 cm$^2$/V/s, about 50 cm$^2$/V/s to about 400 cm$^2$/V/s, about 50 cm$^2$/V/s to about 500 cm$^2$/V/s, about 75 cm$^2$/V/s to about 100 cm$^2$/V/s, about 75 cm$^2$/V/s to about 200 cm$^2$/V/s, about 75 cm$^2$/V/s to about 300 cm$^2$/V/s, about 75 cm$^2$/V/s to about 400 cm$^2$/V/s, about 75 cm$^2$/V/s to about 500 cm$^2$/V/s, about 100 cm$^2$/V/s to about 200 cm$^2$/V/s, about 100 cm$^2$/V/s to about 300 cm$^2$/V/s, about 100 cm$^2$/V/s to about 400 cm$^2$/V/s, about 100 cm$^2$/V/s to about 500 cm$^2$/V/s, about 200 cm$^2$/V/s to about 300 cm$^2$/V/s, about 200 cm$^2$/V/s to about 400 cm$^2$/V/s, about 200 cm$^2$/V/s to about 500 cm$^2$/V/s, about 300 cm$^2$/V/s to about 400 cm$^2$/V/s, about 300 cm$^2$/V/s to about 500 cm$^2$/V/s, or about 400 cm$^2$/V/s to about 500 cm$^2$/V/s, including increments therein. In some embodiments, the first ARGO, second ARGO, or both, have an electromobility of about 1 cm$^2$/V/s, about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, about 400 cm$^2$/V/s, or about 500 cm$^2$/V/s. In some embodiments, the first ARGO, second ARGO, or both, have an electromobility of at least about 1 cm$^2$/V/s, about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, or about 400 cm$^2$/V/s. In some embodiments, the first ARGO, second ARGO, or both, have an electromobility of at most about 2 cm$^2$/V/s, about 5 cm$^2$/V/s, about 10 cm$^2$/V/s, about 25 cm$^2$/V/s, about 50 cm$^2$/V/s, about 75 cm$^2$/V/s, about 100 cm$^2$/V/s, about 200 cm$^2$/V/s, about 300 cm$^2$/V/s, about 400 cm$^2$/V/s, or about 500 cm$^2$/V/s.

In some embodiments, the first ARGO, second ARGO, or both, have a conductivity of about 1,000 S/m to about 3,000 S/m. In some embodiments, the first ARGO, second ARGO, or both, have a conductivity of at least about 1,000 S/m, 1,250 S/m, 1,500 S/m, 1,750 S/m, 2,000 S/m, 2,250 S/m, 2,500 S/m, 2,750 S/m, or more, including increments therein.

TABLE 3

|  | ARGO-1 | ARGO-2 |
| --- | --- | --- |
| Appearance | Powder | Powder |
| Apparent density (g/cm$^3$) | 0.001-0.007 | 0.001-0.006 |
| Carbon content (wt %) | 80-95 | 90-98 |
| Oxygen content (wt %) | 5-20 | 2-4 |
| Nitrogen content (wt %) | <0.3 | <0.3 |
| Hydrogen content (wt %) | <2 | 0.7-0.9 |
| C/O weight ratio | 5-6 | 15-20 |
| C/O atomic ratio | 6-8 | 20-30 |
| Ash (wt %) | <1 | <0.5 |
| Lateral size of GO sheets (μm) | 0.1-1.0 | 0.1-1.0 |
| Surface Area (m$^2$/g) | 600-800 | 700-1100 |
| Conductivity (S/m) | 3,000-3,500 | 2,000-5,000 |

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A method for forming activated graphene oxide sheets, the method comprising:
   heating a first solution comprising at least about 60% by volume of an etchant and graphene oxide to form activated graphene oxide sheets comprising in-plane pores;
   filtering the first solution to purify the activated graphene oxide sheets; and
   spray drying the activated graphene oxide sheets wherein an outlet temperature of the spray drying is at least about 30° C.,
   wherein the activated graphene oxide sheets have a D:G ratio of about 0.1:1 to about 1:1.5.

2. The method of claim 1, wherein the spray drying is performed at a flow rate of about 1 ml/hr to about 6,000 ml/hr.

3. The method of claim 1, wherein the spray drying is performed at a pressure of about 10 psi to about 50 psi.

4. The method of claim 1, wherein the spray drying is performed with an inlet temperature of about 120° C. to about 200° C.

5. The method of claim 1, wherein an outlet temperature of the spray drying is about 30° C. to about 80° C.

6. The method of claim 1, further comprising reducing the activated graphene oxide to form activated reduced graphene oxide sheets.

7. The method of claim 6, wherein reducing the activated graphene oxide comprises drying the activated graphene oxide sheets.

8. The method of claim 6, wherein reducing the activated graphene oxide sheets comprises microwaving the activated graphene oxide after thermal reduction to form an activated reduced graphene oxide.

9. The method of claim 8, wherein the microwaving occurs over a period of time of about 5 seconds to about 300 seconds, and at a power of about 500 W to about 2,000 W.

10. The method of claim 6, wherein reducing the activated graphene oxide comprises:
   (a) heating a second solution comprising:
      (i) the activated graphene oxide; and
      (ii) a strong base; and
   (b) adding a reducing agent to the second solution;
   (c) filtering and washing the reducing agent and the second solution.

11. The method of claim 6, wherein reducing the activated graphene oxide sheets comprises annealing the spray dried graphene oxide sheets.

12. The method of claim 11, wherein the annealing is performed at a temperature of about 150° C. to about 1,500° C.

13. The method of claim 6, wherein the activated reduced graphene oxide sheets have a conductivity of about 1,000 S/m to about 3,000 S/m.

14. The method of claim 1, wherein the activated graphene oxide sheets have a defect density of the in-plane pores of about 0.1 to about 2.

15. The method of claim 1, wherein the activated graphene oxide sheets have a surface area of about 450 m$^2$/g to about 1,500 m$^2$/g.

16. The method of claim 1, wherein the activated graphene oxide sheets comprises a plurality of layers forming interlayer pores therebetween.

17. The method of claim 1, wherein an outlet temperature of the spray drying is at least about 50° C.

18. The method of claim 1, wherein an outlet temperature of the spray drying is at least about 70° C.

19. The method of claim 1, wherein the pores in the activated graphene oxide sheets have a size of about 0.5 nm to about 5 nm.

20. The method of claim 19, wherein the activated graphene oxide sheets have a surface area of about 450 m$^2$/g to about 1,500 m$^2$/g.

21. A method for forming activated graphene oxide sheets, the method comprising:
   heating a first solution comprising an etchant and graphene oxide to form activated graphene oxide sheets comprising in-plane pores;
   filtering the first solution to purify the activated graphene oxide sheets; and
   spray drying the activated graphene oxide sheets wherein an outlet temperature of the spray drying is at least about 30° C.,
   wherein the spray drying is performed with an inlet temperature of about 120° C. to about 200° C.

* * * * *